United States Patent
Ohashi

(10) Patent No.: US 12,026,654 B2
(45) Date of Patent: Jul. 2, 2024

(54) CENTRAL SERVICE THAT GENERATES EVALUATION SCORES FOR ENTITIES

(71) Applicant: David Michael Ohashi, Renton, WA (US)

(72) Inventor: David Michael Ohashi, Renton, WA (US)

(*) Notice: Subject to any disclaimer, the term of this patent is extended or adjusted under 35 U.S.C. 154(b) by 0 days.

(21) Appl. No.: 18/389,160

(22) Filed: Nov. 13, 2023

(65) Prior Publication Data

US 2024/0161042 A1 May 16, 2024

Related U.S. Application Data

(60) Provisional application No. 63/425,984, filed on Nov. 16, 2022.

(51) Int. Cl.
*G06Q 10/0639* (2023.01)
*G06Q 10/0631* (2023.01)

(52) U.S. Cl.
CPC . *G06Q 10/06393* (2013.01); *G06Q 10/06315* (2013.01)

(58) Field of Classification Search
CPC .............. G07C 1/10; G06Q 10/063114; G06Q 10/1091; G06Q 10/103; G06Q 10/0633; G06Q 10/06311; G06Q 10/06393; G06Q 10/06398
See application file for complete search history.

(56) References Cited

U.S. PATENT DOCUMENTS

| | | | |
|---|---|---|---|
| 7,004,389 B1 * | 2/2006 | Robinson | G07C 1/10 235/382 |
| 8,669,845 B1 * | 3/2014 | Chakraborty | G06Q 50/00 235/440 |
| 9,092,502 B1 * | 7/2015 | Cannaliato | G06F 16/215 |
| 9,535,878 B1 * | 1/2017 | Brinkmann | G08G 1/0112 |
| 9,984,427 B2 * | 5/2018 | Dave | G06Q 50/01 |
| 10,032,318 B1 * | 7/2018 | Ferguson | G07C 5/0891 |
| 10,360,738 B1 * | 7/2019 | Ferguson | G07C 5/0825 |
| 10,402,771 B1 * | 9/2019 | De | G08G 1/20 |
| 10,431,106 B1 * | 10/2019 | Tolland | G09B 5/00 |
| 10,504,304 B1 * | 12/2019 | Ferguson | G07C 5/0891 |

(Continued)

OTHER PUBLICATIONS

Bannach, David et al., Automatic Event-Based Synchronization of Multimodal Data Streams from Wearable and Ambient Sensors EuroSSC 2009, 2009 (Year: 2009).*

(Continued)

*Primary Examiner* — Scott L Jarrett
(74) *Attorney, Agent, or Firm* — Workman Nydegger

(57) ABSTRACT

Techniques for provisioning a central, cloud-based service (i) that generates customized queries for execution against multiple third-party applications to collect certain metric data and (ii) that generates an evaluation score based on the collected metric data are disclosed. A corresponding query is created for each of the third-party applications. Each query is designed to extract certain metric data. The queries are transmitted to their corresponding third-party applications. Metric data is returned, including first and second metric data. The first and second metric data are used to validate one another with respect to an event, which is classified. The metric data is weighted. An evaluation score is then generated based on the weighted metric data.

17 Claims, 23 Drawing Sheets

(56) References Cited

U.S. PATENT DOCUMENTS

| | | | | |
|---|---|---|---|---|
| 10,657,132 | B2* | 5/2020 | Rogynskyy | G06F 40/20 |
| 10,679,307 | B2* | 6/2020 | Dewalt | G06Q 10/06398 |
| 10,803,499 | B1* | 10/2020 | Davis | G06Q 10/1097 |
| 10,891,808 | B1* | 1/2021 | Ferguson | G07C 5/0891 |
| 10,974,728 | B2* | 4/2021 | A G | G06T 7/80 |
| 11,507,909 | B2* | 11/2022 | Jones | H04W 4/38 |
| 11,551,139 | B1* | 1/2023 | Finamore | G06N 5/047 |
| 11,599,811 | B1* | 3/2023 | Savastinuk | G06N 5/041 |
| 11,688,209 | B1* | 6/2023 | Ferguson | G07C 5/0891 701/32.3 |
| 11,853,361 | B1* | 12/2023 | Choudhary | H04L 43/55 |
| 2002/0175211 | A1* | 11/2002 | Dominquez | G06K 17/0022 235/492 |
| 2003/0233278 | A1* | 12/2003 | Marshall | G06Q 30/0211 705/14.35 |
| 2006/0265295 | A1* | 11/2006 | Feanny | G07C 1/10 705/32 |
| 2009/0086936 | A1* | 4/2009 | Clifford | G06Q 10/1091 379/88.13 |
| 2012/0191502 | A1* | 7/2012 | Gross | G06F 16/951 705/7.27 |
| 2013/0030873 | A1* | 1/2013 | Davidson | G07C 5/0808 705/7.36 |
| 2015/0154249 | A1* | 6/2015 | Dave | G06F 16/951 707/758 |
| 2015/0242793 | A1* | 8/2015 | Williams | G06Q 10/06398 705/7.42 |
| 2015/0363745 | A1* | 12/2015 | Hatch | G06Q 10/1091 705/32 |
| 2016/0078390 | A1* | 3/2016 | Grewal | G06Q 10/06398 705/7.42 |
| 2016/0171633 | A1* | 6/2016 | DeWalt | G06Q 10/06398 705/7.15 |
| 2016/0239780 | A1 | 8/2016 | Liljenquist et al. | |
| 2017/0046785 | A1* | 2/2017 | Herrington | G06Q 40/08 |
| 2017/0116552 | A1* | 4/2017 | Deodhar | G06Q 10/0639 |
| 2017/0301039 | A1* | 10/2017 | Dyer | G06Q 10/063114 |
| 2018/0005161 | A1* | 1/2018 | Cong | G06Q 10/06398 |
| 2018/0122157 | A1* | 5/2018 | Tomoda | G06Q 10/1091 |
| 2018/0144427 | A1* | 5/2018 | Ebesu | G08B 21/06 |
| 2019/0213522 | A1* | 7/2019 | Cong | G06Q 10/06393 |
| 2019/0329118 | A1* | 10/2019 | Balakrishnan | G16H 20/30 |
| 2019/0361890 | A1* | 11/2019 | Rogynskyy | H04L 51/234 |
| 2019/0378348 | A1* | 12/2019 | Fox | H04L 67/535 |
| 2020/0019912 | A1 | 1/2020 | Tilton et al. | |
| 2020/0079387 | A1* | 3/2020 | A G | B60W 40/09 |
| 2020/0110651 | A1 | 4/2020 | Milman | |
| 2020/0251204 | A1 | 8/2020 | Teodoro et al. | |
| 2021/0174624 | A1* | 6/2021 | Haci | G07C 9/33 |
| 2022/0147889 | A1* | 5/2022 | Frederick | G06Q 10/0635 |
| 2022/0172169 | A1* | 6/2022 | Carzoli | G06Q 10/1091 |
| 2022/0301357 | A1* | 9/2022 | Carzoli | H04W 4/021 |
| 2022/0324461 | A1* | 10/2022 | Kuehnle | B60W 40/02 |
| 2023/0260552 | A1* | 8/2023 | Bose | H04N 5/765 463/31 |
| 2023/0331239 | A1* | 10/2023 | Leong | B60W 40/09 |
| 2023/0421654 | A1* | 12/2023 | Rogynskyy | G06F 11/3024 |

OTHER PUBLICATIONS

Alborno, Paolo et al., The Mult-Event-Class Synchronization (MECS) Algorithm arxiv.org, Apr. 8, 2019 (Year: 2019).*

Sage Tracks—Company Administrator Guide Sage, Oct. 2017 (Year: 2017).*

International Search Report and Written Opinion received for PCT Patent Application No. PCT/US2023/079662, mailed on Mar. 5, 2024, 12 pages.

* cited by examiner

| | Minus 5 | Minus 3 | Zero | Plus 3 | Plus 5 |
|---|---|---|---|---|---|
| Clock in to shift | Does not clock in for shift | Clock in 15+ mins late for scheduled shift | | Clocks in within +/- 5 mins of scheduled state time | Clock in 10 mins prior to start of scheduled shift |
| Clock out of shift | Does not clock out of shift | Clock out 30+ mins after end of scheduled shift | | Clock out within 30 minutes of end of scheduled shift | Clocks out for shift |
| Lunch | No lunch; unexcused; no note | Extended or shortened lunch by 15+ mins unexcused | No lunch; excused or incorrect punches with note, excused | | 30 min lunch; correct punches |
| Clock-in location | Not at company verified site upon clock-in | | | | On time clock in at correct location |
| Discrepancies | | Discrepancies; no note | | Corrects discrepancies via note | No discrepancies |

Table 400

*Figure 4*

Productivity Ratio
500

7/22/22

| Start Time | Work/Task | End Time | Hours |
|---|---|---|---|
| 7:37 | Engine on | 8:34 | 0:57 |
| 8:34 | Jobs | 13:00 | 4:26 |
| 13:00 | Lunch | 13:15 | |
| 13:15 | Jobs | 17:40 | 4:25 |
| 17:40 | Base | 18:00 | 0:20 |
| | Total | | 10:08 |
| | Billable Hours | | 8:51 |

| Start Time | Work/Task | End Time | Hours |
|---|---|---|---|
| 8:45 | Maintenance Jobs | 13:00 | 6:15 |
| 13:00 | Lunch | 13:15 | |
| 13:15 | Maintenance Jobs | 18:20 | 5:05 |
| | Total | | 10:20 |

Productivity Ratio: 78.09%

7/23/22

| Start Time | Work/Task | End Time | Hours |
|---|---|---|---|
| 7:30 | Engine on | 8:31 | 1:01 |
| 8:31 | Jobs | 13:00 | 4:29 |
| 13:00 | Lunch | 13:15 | |
| 13:15 | Jobs | 17:04 | 3:49 |
| 17:04 | Base | 17:26 | 0:22 |
| | Total | | 9:41 |
| | Billable Hours | | 8:18 |

| Start Time | Work/Task | End Time | Hours |
|---|---|---|---|
| 7:00 | Maintenance Jobs | 13:00 | 6:00 |
| 13:00 | Lunch | 13:15 | |
| 13:15 | Maintenance Jobs | 17:35 | 4:20 |
| | Total | | 10:20 |

Productivity Ratio: 80.31%

7/24/22

| Start Time | Work/Task | End Time | Hours |
|---|---|---|---|
| 7:54 | Engine on | 8:59 | 1:05 |
| 8:59 | Jobs | 13:00 | 4:01 |
| 13:00 | Lunch | 13:15 | |
| 13:15 | Jobs | 16:07 | 2:52 |
| 16:07 | Base | 17:03 | 0:56 |
| | Total | | 9:54 |
| | Billable Hours | | 6:53 |

| Start Time | Work/Task | End Time | Hours |
|---|---|---|---|
| 7:00 | Maintenance Jobs | 13:00 | 6:00 |
| 13:00 | Lunch | 13:15 | |
| 13:15 | Maintenance Jobs | 17:15 | 4:00 |
| | Total | | 10:00 |

Productivity Ratio: 68.83%

*Figure 5*

Data Extraction
705

| Targeted Data For Extraction |
|---|
| ■ Time of Clock In |
| ■ Location of Clock In |
| ☐ Total Lunch Time |
| ☐ Total Mobilization Time |
| ■ Time of Clock Out |
| ■ Date of Work |

| | |
|---|---|
| ☒ Mon, 4/3 [OST] Nursery Crew \| 07:00 am – 03:37 pm \| 0:30 |
| ☒ Tue, 4/4 [OST] Nursery Crew \| 06:59 am – 04:07 pm \| 0:29 |
| ☒ Wed, 4/5 [OST] Nursery Crew \| 07:00 am – 03:32 pm \| 0:30 |
| ☒ Thu, 4/6 [OST] Nursery Crew \| 07:00 am – 03:31 pm \| 0:29 |
| ☒ Fri, 4/7 [OST] Nursery Crew \| 06:57 am – 03:40 pm \| 0:34 |
| ☒ Mon, 4/10 [OST] Nursery Crew \| 07:00 am – 03:15 pm \| 0:00 |
| ☒ Tue, 4/11 [OST] Nursery Crew \| 07:02 am – 03:47 pm \| 0:30 |

| Targeted Data For Extraction |
|---|
| ■ Time of Ignition On |
| ■ Location of Ignition On |
| ☐ Arrival Time |
| ☐ Departure Time |
| ■ Verified Location |
| ☐ Total Idle Time |

| Ignition On | Idling Start |
|---|---|
| 07:02 AM | 8675309 Renton St., Seattle, WA |
| 07:02 AM | 8675309 Renton St., Seattle, WA |
| 07:02 AM | 8675309 Renton St., Seattle, WA |
| 07:04 AM | 8675309 Renton St., Seattle, WA |
| 07:06 AM | 8675309 Renton St., Seattle, WA |
| 07:08 AM | 8675309 Renton St., Seattle, WA |
| 07:10 AM | 8675309 Renton St., Seattle, WA |
| 07:12 AM | 8675309 Renton St., Seattle, WA |
| 07:14 AM | 8675309 Renton St., Seattle, WA |

Name: Employee A
Date: 4/3/2023
Location: OST
Shift Start: 07:00 am
Ignition On: 07:02 am
Location of Ignition On: 5675309 ...
Verified Location: Y
Shift End Time: 03:37 pm

*Figure 7B*

Household Organization
1700

| Tasks Completed | Date | Points | Name |
|---|---|---|---|
| Do dishes | 8/7 | +5 | John |
| Take out trash | 8/20 | +3 | Josh |
| Take out recycling | 8/20 | +3 | Jay |
| Clean bathroom | 8/21 | +7 | Jazz |

| Tasks Pending | Due By | Points |
|---|---|---|
| Dog walk | 8/27 | +4 |
| Laundry | 8/30 | +4 |
| Mow lawn | 8/30 | +10 |
| Water plants | 8/31 | +5 |

*Figure 17*

CENTRAL SERVICE THAT GENERATES EVALUATION SCORES FOR ENTITIES

CROSS-REFERENCE TO RELATED APPLICATIONS

This application claims the benefit of and priority to U.S. Provisional Patent Application Ser. No. 63/425,984 filed on Nov. 16, 2022 and entitled "CENTRAL SERVICE THAT GENERATES EVALUATION SCORES FOR ENTITIES," which application is expressly incorporated herein by reference in its entirety.

BACKGROUND

As defined by the Small Business Administration (SBA), a "small business" is a firm that has less than 500 employees. Current statistics estimate that there are about 32.5 million small businesses in the United States. Interestingly, small businesses account for about 99.9% of all the businesses that operate in the US. From that metric, one can appreciate how a majority of jobs in the US are actually created by small businesses and their owners. Of course, the disclosed principles apply to all businesses, regardless of their location.

Small business are faced with a variety of hurdles. Statistically, more than 20% of small businesses end up failing in their very first year. Nearly 50% of small businesses end up failing within their first five years of operation. One of the primary reasons that a small new enterprise or small business fails is because that business lacks market demand. If the business has low market demand, then it follows that the business will eventually also lack capital. From this brief description, one can readily see how small businesses are faced with a variety of different challenges.

Many small businesses operate in fields that generally do not require high levels of technology to function. For instance, consider most landscaping small businesses. The employees that perform the landscaping generally do not require high-tech instrumentation to perform their jobs well. Similarly, consider a window installer. Typically, the employees installing the windows also generally do not require high-tech instrumentation to install the windows, though in some scenarios, advanced artificial intelligence (AI) technology is now being used, such as to scan objects or to perform 3D printing.

With that in mind, think of the countless numbers of different services and applications that are available for businesses. Many of these services and applications go unused simply because they are over-engineered for businesses that do not require high levels of technological assistance. For instance, there are almost an unlimited number of different project management applications, fleet tracking management applications, digital time keeping applications, mapping and measurement applications, and even information storage systems. Many small businesses end up refraining from using these different services or applications because those applications are overly complex or provide features that are not necessary for the small business to operate. In other words, those applications are over-engineered, and that over-engineering disincentivizes the small businesses from incorporating those applications into their operational processes. Even further, the onboarding process and the learning curve to adopt new systems can be challenging. Additionally, teams often are unwilling to spend additional money on management applications that cannot be easily utilized.

To summarize the above, today, there is an overabundance of existing platforms (e.g., services, applications, etc.) that provide a significant number of different features and options. Due to the various constraints that small businesses have, it is often the case that small businesses are deterred from using, or at least fully using, these over-engineered platforms because those platforms are not only costly, but they also provide services and features that are likely not utilized or of value to specific types of small businesses. Stated differently, there are many individual features of an application that a small business would likely be interested in using, but the small business is deterred from consuming the entire application "package" because that package includes too many other features that are too complicated and not of specific value to the business. What is needed, therefore, is a technique for enabling entities to be able to selectively incorporate specific features from different applications into a unified platform that is tailored for the small business, but to do so without necessarily having to adopt the entire package of an application. In other words, it is desirable to provide a customizable suite of application utility features without having to adopt other features that may be of no or little value to a small business.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods for provisioning a central, cloud-based or other appropriate service (i) that generates customized queries for execution against multiple third-party applications to collect certain metric data, (ii) that generates an evaluation score based on the collected metric data, and (iii) that generate custom queries to request external application data so as to parse, format, and analyze data to increase business efficiency. In particular, there is an overabundance of software applications that exhibit the problems mentioned earlier, but none of these software applications go far enough to utilize their gathered data for analysis or system improvements which provide long term benefit affecting the bottom line and continual improvement of user and company processes. The disclosed embodiments build a modular system whereby businesses may pick and choose what features they need, or want to adopt, and adapt only for those services and their prerequisite systems. They can also choose to keep their current systems and utilize the disclosed embodiments to make their data work for them.

In particular, for each of the third-party applications, some embodiments generate a corresponding query that is executable. The corresponding query is designed to extract metric data from each third-party application. The query generation process is performed via use of corresponding application programming interfaces (APIs) that are provided to facilitate metric data extraction from the third-party applications.

The embodiments transmit, over one or more networks, each respective query to its corresponding third-party application. The embodiments also receive, from each of the third-party applications, a corresponding data structure comprising raw or metric data that was generated based on execution of the respective query.

Notably, a first data structure comprising first raw or metric data is received from a first third-party application, and a second data structure comprising second raw or metric data is received from a second third-party application. The first data structure is different from the second data structure.

The embodiments determine that the first raw or metric data and the second raw or metric data correspond to the same event. Despite the second data structure being different from the first data structure, the embodiments use the first raw or metric data and the second raw or metric data to validate one another with respect to the event (e.g., a cross verify operation), potentially through two or more verifiable pieces of data, including, but not limited to, GPS location data and timestamp data across third parties and any type of enterprise device. The embodiments also classify the event, which (as mentioned) corresponds with both the first metric data and the second metric data. As a result, a classification for the event is determined. The embodiments weight the metric data based on a set of predefined weighting criteria and based on the classification for the event. Additionally, the embodiments generate an evaluation score based on the weighted metric data. Optionally, data metrics may also be processed and accepted as part of a timeline of events.

Some embodiments additionally map the evaluation score to a stimulus factor. Such embodiments can also alert a user associated with the evaluation score regarding the stimulus factor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 4 illustrates different techniques for categorizing metric data.

FIG. 5 illustrates another example of different types of metric data, such as in the form of a productivity ratio.

FIGS. 7A and 7B illustrate an example of what an actual schedule might look like for an employee and the target areas throughout their day to improve daily efficiencies and illustrate different data that can be mined.

FIG. 17 illustrates an example household organization and how points can be earned.

DETAILED DESCRIPTION

Figure 1:
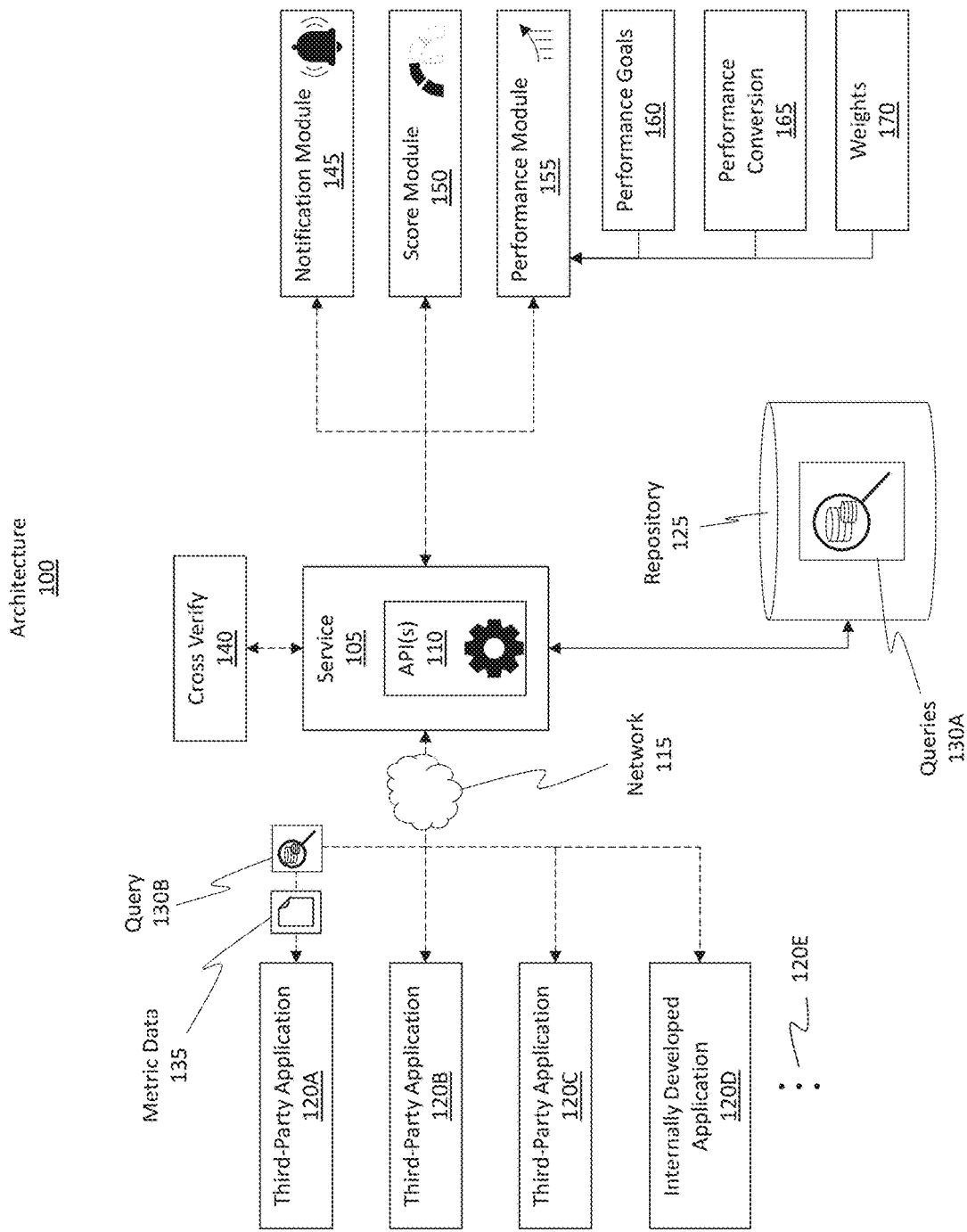
FIG. 1 illustrates an example architecture that can be implemented to perform the various disclosed operations.

Embodiments disclosed herein relate to systems, devices, and methods for provisioning a central, cloud-based or other appropriate service (i) that generates customized queries for execution against multiple third-party applications to collect certain metric data and (ii) that generates an evaluation score based on the collected metric data. As used herein, the terms "user", "employee", "member", "entity", "team," "business," or even "organization" can be interchanged with one another. Generally, these terms refer to entities that use the features and functionalities of the disclosed service. The phrase "metric data" should include any type of data, including potentially raw data.

For each of the third-party applications, the embodiments generate a query. The query is designed to extract data, including, perhaps, data that is of a pre-selected type. By "pre-selected type," it is meant that the query includes parameters that enable the query to obtain filtered, pinpointed, or specifically selected data from an application, even though an abundance of other types of data might also be available from that application. The query generation process can be performed via use of various APIs (e.g., to identify the inputs and outputs of the applications and to enable the query to properly interact with the application).

The embodiments transmit the queries to their corresponding third-party applications. The embodiments then receive (e.g., from each of the third-party applications) a data structure comprising data that was generated based on execution of the respective query. A first data structure, which includes first data, is received from a first third-party application. Similarly, a second data structure, which includes second data, is received from a second third-party application. The first data structure is different from the second data structure. In some implementations, the embodiments can operate using a single data structure, such as by adding events to a timeline.

The embodiments determine that the first metric data and the second metric data correspond to the same event. Despite the second data structure being different from the first data structure, the embodiments use the first metric data and the second metric data to validate one another with respect to the event (e.g., a cross verify operation).

The embodiments also classify the event. The embodiments weight the metric data based on a set of predefined weighting criteria. The metric data can also be weighted based on the event's classification. The embodiments then generate an evaluation score based on the weighted metric data.

Some embodiments additionally map the evaluation score to a stimulus factor (e.g., cash, gift card, vacation, or any other scalable reward). Optionally, the embodiments can also alert a user associated with the evaluation score regarding the stimulus factor. Other features will be discussed in more detail shortly.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments provide many substantial benefits, advantages, and practical applications to the technical field of data analytics, data management, and service provisioning. As some various non-limiting examples, the embodiments beneficially enable small businesses to customize a suite of tools or services for their use, thereby enabling those businesses to operate in a more efficient manner. That is, instead of being bombarded with an excessive number of different services, many of which may not be applicable to a small business, the small business is provided with techniques to enable the business to selectively and intelligently filter which services and which features of those services the small business would like to utilize. Those filtered services/features are then made available to the small business, thereby leading to improve operational performance and data management for the small business. In some cases, the embodiments are also beneficially able to filter which data to extract.

Stated differently, with existing services and platforms, there is an overabundance of information, resulting in a scenario where substantial amounts of information and services are either not utilized at all or are at best underutilized. Traditional systems would employ multiple, complicated platforms that were designed to sometimes execute simple tasks as well as many complex tasks. Traditional systems were often found to be deficient in collecting factual data, analyzing that data, and integrating that data to improve production efficiency and employee performance for small business entities. Similarly, traditional employee evaluations and compensation techniques were often weighted or biased by subjective factors. In effect, traditional systems were largely overpowered and provided exorbitant amounts of information, which itself led to significant hurdles and challenges for small business. More generally, traditional systems are deficient in how they present data in an efficient way for utilization.

The disclosed embodiments introduce a new approach to information, employee, and performance management. In some implementations, the embodiments utilize a cloud-based or similar platform that can communicate and interact with existing platforms. The cloud platform, or service, can extract data from those other platforms, analyze the data, and interpret the data to provide real-time analytics and employee performance reporting that is derived from objective metrics. The disclosed embodiments are highly scalable to countless environments and team dynamics.

In effect, the embodiments are able to maximize the benefits of various platforms and tools for use with any business. Whereas traditional platforms were overly convoluted and tried to provide a one-size-fits-all approach, the embodiments are able to selectively mix data derived from the features from any number of these existing platforms to provide a suite of tools that are customized to individual small businesses, as opposed to the one-size-fits-all approach. The embodiments also provide a highly scalable and navigable data management and analytics service. Beneficially, the embodiments improve team and employee efficiency, improve business operations, and recognize and reward employee contributions.

As yet another benefit, the embodiments are able to incentive specific types of behaviors from employees, to thereby lead those employees to become more efficient and perhaps profitable. In particular, the embodiments are able to generate an evaluation score for an individual employee and/or for a team of employees. The embodiments are able to map or translate that score to a stimulus factor that can be directly correlated with a dollar amount or reward that can be distributed to an employee. For instance, as an employee's evaluation score increases, the increase of the score can be translated into a dollar amount that the employee has saved for the business or perhaps has increased profits for the business. Based on that translation, a portion of the savings or profits can then be distributed to the employee, thereby incentivizing the employee to continue to improve his/her performance in order to reap further monetary or other types of rewards. Accordingly, the embodiments are beneficially able to map or translate evaluation scores to actual dollar amounts in an effort to incentivize certain behavior.

It should be noted that the disclosed principles can be applied to any type of business, or small business. Examples of such businesses include, but certainly are not limited to, any type of landscaping business, construction business, food service business, retail business, specialty trade business, engineering business, maintenance business, design business, and so on, without limit. The embodiments can also be employed within the family unit or even the classroom. Indeed, any environment where performance is measured can be benefitted by incorporating the disclosed principles.

As further benefits, the disclosed embodiments relate to a cloud-based web application that can be accessible via web browsers as well as a downloadable application that is compatible with any type of operating system. The embodiments utilize existent platforms and tools, such as digital timekeeping or fleet tracking software, to create a single user interface that can compile and report extracted data. The extracted data is compiled and processed by the disclosed service to result in an objective point-scoring system as well as deployed proactive notifications to ensure engagement and timely completion with utilized tools. In some cases, a single user interface can be surfaced, where this interface displays compiled data that has been processed and analyzed.

The embodiments beneficially allow clients to get the most out of the tools they might already use to create ease of use and to ensure correct and efficient utilization by employees. Use of the objective scoring system results in a transparent view into individual and group performance, which can then be acknowledged and rewarded as appropriate.

The disclosed service is scalable to fit countless group dynamics and purposes. The service allows for tailoring and customization on a case-by-case basis to include the expectations, platforms, metrics, information, and more that shape each client. The embodiments also beneficially emphasize the importance of user security and usability.

As yet another benefit, the disclosed embodiments effectively provide an employee performance evaluation tool that is unbiased and objective. Such a tool can replace subjective employee performance reviews. Accordingly, these and numerous other benefits will now be discussed in more detail throughout the remaining portions of this disclosure.

Example Architecture

Having just described some of the various benefits the embodiments can provide, attention will now be directed to FIG. 1, which illustrates an example architecture 100 that can be implemented to perform various actions to achieve the above-described benefits. Architecture 100 is shown as including a service 105.

Service 105 can be a cloud-based service operating in a cloud environment. In some cases, service 105 can be a local service operating on a local device. In some cases, service 105 can be a hybrid service comprising a cloud portion and a local, client portion. In any event, service 105 is tasked with performing various operations, as will be discussed in more detail throughout this disclosure.

Service 105 is shown as comprising, or at least interfacing with, any number of application programming interfaces, or APIs 110. As used herein, the term "API" generally refers to a set or collection of protocols and definitional data structures that can be used to communicate and interact with an application software. That is, an API allows one application to communicate with another application without the first application having to know the specific details as to how the second application operates through the process of data centralization and processing.

The APIs 110 enable the service 105 to communicate over one or more networks (e.g., network 115) with any number of third-party applications, such as third-party applications 120A, 120B, and 120C. Internally developed application 120D can also be included and can provide input. The ellipsis 120E illustrates how service 105 can communicate with any number of third-party applications or internally developed application 120D. In some cases, the third-party applications can be associated with any type of computing device, sensor, or even an Internet of Things (IoT) device.

The data that is produced by the third-party applications can also be of any type. In some cases, the data can be sensor data, such as perhaps environmental condition data or any other type of sensor data. In some cases, the data can telemetry data, human generated data, computer generated data, data that is inferred from other data, or any other type of data.

Optionally, service 105 can be registered with or subscribed to the third-party applications. In some cases, service 105 is not registered with those applications but is still able to acquire information from those applications.

Optionally, the third-party applications can be configured to grant service 105 a heightened or privileged level of access to the third-party applications so that service 105 can obtain desired metric data. In some cases, this heightened privilege is provided to service 105 for a defined period of time. At the expiration of that time, service 105 may be required to obtain new credentials or updated privilege. In some implementations, service 105 periodically obtains new credentials to communicate with the third-party applications.

In some cases, the API(s) 110 are included as a part of service 105. In other cases, the API(s) 110 are external relative to service 105, but those API(s) are usable by service 105 to communicate with the third-party applications.

Any type of network or network connection can be used by service 105. For instance, network 115 can be a wide area network, such as the Internet. In some cases, network 115 can be a telecommunications network, such as perhaps a 3G, 4G, 5G, or some other type of telecommunications network. In some cases, network 115 can additionally, or alternatively, be a local area network.

The third-party applications can be any type of third-party applications. Examples of such applications include, but certainly are not limited to, any type of vehicle fleet tracking application, time management application, clock-in or clock-out application, warehouse inventory application, global positioning service (GPS) application, purchasing application, project management, information management, and so on. A person skilled in the art will appreciate how any type of application can be provided.

In some cases, these third-party applications represent existing applications that typically provided an overabundance of services or data to small businesses, as mentioned previously. The embodiments are able to configure service 105 to communicate with the various third-party applications and to enable service 105 to selectively incorporate specific features, but not necessarily all of the features, from the various third-party applications. That is, the embodiments are able to selectively incorporate specific features and data, not necessarily all of the features and data.

In effect, the embodiments enable a centralized, single point of contact (e.g., service 105) for a business, group, or organization to use, and that single point of contact can be used to access specific features that may be distributed among any number of different applications. Stated differently, service 105 provides a suite of tools and functionality. These tools are made available from any number of different applications that are distributed relative to one another and that are distinct relative to one another. Using the APIs 110, service 105 can access the various features and services of the third-party applications to provide a customized suite of functionality for an individual business or entity.

In architecture 100, service 105 is shown as including or having access to a repository 125, which is a type of persistable data storage unit. Service 105 is able to analyze the various different third-party applications and then generate tailored or customized queries 130A based on that analysis.

For instance, having analyzed the third-party applications, the service 105 has gained an understanding as to what the inputs and outputs of the various different applications might be, as well has how those inputs and outputs are structured (e.g., the data structures of those inputs and outputs). Such information can be obtained using the various different APIs 110.

Service 105 is able to generate any number of queries 130A in order to communicate with the third-party applications. These queries 130A can be used to obtain specific types of data or metric data that service 105 may be interested in acquiring, where that data is perhaps based on user-defined criteria.

As indicated above, queries 130A can be pre-generated queries based on known or determined characteristics of the third-party applications. In some cases, the queries 130A are periodically updated based on updated characteristic data obtained from the third-party applications.

For instance, suppose one of the third-party applications recently underwent a version update. Service 105 can be informed or notified regarding this version update and can then proceed to update the query that is associated with that third-party application. In some instances, the existing query can be updated to reflect the new version of the application. In other instances, a new query can be generated and can replace the previous query. An audit log of queries and delta changes can optionally be maintained.

The queries 130A can be generated, in some instances, using machine learning. For instance, a machine learning engine can examine the operational characteristics of the third-party applications. Having gained an understanding of how the third-party applications function, the machine learning engine can then generate the queries. In some instances, the machine learning engine also consults with a user to learn which specific features or metric data are of importance to the user. The machine learning engine can then use this information to customize the queries so that those queries, when executed, will produce the desired metric information.

In some cases, queries 130A can be embedded with an authentication token to enable the query to execute against its corresponding third-party application. The authentication token can optionally be provided with a lifespan so that the token will eventually expire. When the token does expire, a new token can be issued to the query and can be included in the query.

In some cases, the token is not included in the query but instead is included in an authentication vault that is associated with service 105. Before a query is transmitted to a third-party application, service 105 can access the authentication vault and can obtain the token for that query and that third-party application. The service can then append or attach the token to the query. Optionally, the token and/or query can be encrypted prior to transmission. Once the token and query are received by the third-party application, the token and query pair can be decrypted.

In some cases, one or more queries can be generated for execution against a device as opposed to execution against an application. For instance, the service can interact with any number of Internet of Things (IoT) devices that perhaps may not be running user-oriented applications. Service 105 can optionally generate a query that is executable against this IoT device to obtain data from the device, such as perhaps sensor data the device might generate or any other operational data produced by the device. In some cases, data from devices are collected and stored in a database, which is then accessible by an API, service, or other application.

An example of the above principles will be helpful. Suppose the third-party application 120A is a vehicle fleet tracking application that monitors the locations, speeds, inventory, price per mile, and other activity of various vehicles. This fleet tracking application might include a plethora of different features or services. It may be the case, however, that a small business entity desires only to track the location and speed of its vehicles. Service 105 can generate a query that has parameters selected to obtain information related only to the location and speed of vehicles.

That is, a query can be designed to obtain only specific type of metric data from an application. This query can be designed to refrain from obtaining other types of available metric data from the application.

Service 105 accesses the desired query for the relevant third-party application and then transmits that query (e.g., query 130B) over network 115, such as perhaps to the third-party application 120A. The third-party application 120A is then tasked with executing the query 130B. As a result of executing the query 130B, the third-party application 120A generates specific metric data 135, which is then delivered or transmitted back to service 105, perhaps over the network 115 and which is then added to the database.

In some cases, the same network that transmitted the query 130B is used to transmit the metric data 135. In other cases, a different network is used. For instance, it may be the case that the Internet was used to transmit the query 130B to the third-party application 120A, but the third-party application 120A used a telecommunications network to transmit the metric data 135 back to the service 105.

In some cases, the metric data 135 can be encrypted or obfuscated in some manner in order to protect the underlying data. Once the metric data 135 is received by service 105, service 105 can then decrypt the metric data 135.

When a different network is used to transmit the metric data 135, the embodiments can optionally cause an identification flag or tag to be appended to the metric data 135 to enable the service 105 to readily associate the metric data 135 with the query 130B. For instance, in some cases, the query 130B can be structured to inform the third-party application 120A that whatever response the third-party application 120A generates, the third-party application 120A is to append an identification tag to any data it generates in response to the query. Doing so enables service 105 to readily associate the results of the query (i.e. the metric data) with the actual query.

In some cases, the identification tag can itself be or perhaps can include any type of QR code, bar code, alphanumeric code, or any other type of machine recognizable code. This tag is usable by service 105 to link or associate the generated metric data 135 to the query 130B.

Any number of different queries can be executed against any number of different third-party applications. Similarly, any amount of metric data can be acquired by service 105 based on the execution of the queries.

In some cases, metric data from at least two different third-party applications may correspond to or may reflect the same or similar event. As an example, suppose the third-party application 120A was a fleet tracking application that tracks the location and movement of a truck. Further suppose that the third-party application 120B is a clock-in and clock-out application. In the scenario of a trucking company, it may be the case that a truck driver is deemed "clocked in" only when he/she is driving the truck and not when the truck is being loaded or unloaded, thus, the driver should not clock in until the truck is about ready to move. One can observe how both "clock in" metric and "GPS" data can both correspond to the same event; that is, an event in which the truck is moving or will be able to move. In some cases, the validation process is designed to ensure that employees are not short changed based on valid payroll hours. For instance, with service trucks, there may be a warm up time or a load time that should be viewed as being compensated time. These employees are thus compensated even though the truck is not moving; instead, they are compensated perhaps based on a time during which the engine is running. Thus, there may be various conditions or scenarios that trigger when an employee is to be compensated.

Service 105 might obtain metric data from these two different applications. The fleet tracking application can include metric data (e.g., GPS data) indicating when the truck begins moving. Similarly, the clock-in and clock-out application may include metric data indicating when the truck driver "clocks in." The clock in data from the third-party application 120B and the movement data from the third-party application 120A correspond to the same event, i.e. the initial movement of the truck. Also, productivity ratios may not impact payroll for employees, but they may impact rewards the employees can earn, thereby leading to a bonus.

Service 105 can be configured to review and analyze the different sets of metric data from the different third-party applications in order to perform a cross verify 140 operation by comparing and contrasting the data. For instance, service 105 can cross verify that the truck driver clocked in within a threshold time period relative to when the GPS data (from a different third-party application) indicated that the truck began to move or was about to move.

If the truck driver clocked in significantly before, or perhaps significantly after (e.g., relative to a threshold buffer), the movement of the truck, then that data may indicate a discrepancy in the operational performance of the truck driver.

Accordingly, service 105 can compare and contrast metric data obtained from different sources (e.g., applications, devices, etc.). Furthermore, it may be the case that one set of metric data is formatted differently than another set of metric data. For instance, a first set of metric data may be organized in accordance with a first data structure, and a second set of metric data may be organized in accordance with a second data structure. As one example, the first data structure may be organized in a timestamp format while the second data structure may be organized using environmental condition data or perhaps GPS data. Despite differences in the organization of the data structures, service 105 is still able to perform a cross verify operation to compare and contrast data that is representative of a common or similar event.

From the above discussion, a skilled person will also recognize how service 105 includes the ability to recognize events based on the metric data that it acquires. For instance, service 105 can analyze GPS data to discern that the GPS data reflects an event in which a truck is moving. Similarly, service 105 can analyze "clock in" metric data to discern that the clock in data reflects a scenario where the truck driver is ready to drive his/her truck. The combination of these two sets of metric data reflects or represents an event in which the trick is or will shortly move.

Service 105 includes intelligence for recognizing an event based on metric data. In some cases, the metric data itself may not specifically identify the event or the type of event that is transpiring. Nevertheless, service 105 can infer an event based on the combination of multiple different sets of metric data.

To recognize events, service 105 can optionally incorporate the use of machine learning (ML) or artificial intelligence. As used herein, reference to any type of machine learning may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

An ML engine can be tasked with inferring or deriving an event based on a single set or a collection of metric data. For instance, a particular event may not be immediately recognizable or inferable from a single set of metric data. In some cases, however, the event may be recognizable based on the review of at least two sets of metric data. The ML engine can aggregate multiple different sets of metric data (which were acquired from multiple different sources or applications and which might be formatted differently). Based on this aggregated information, the ML engine can then deduce or infer probability of an event from the collection of metric data. Additionally, the ML engine can optionally be tasked with performing the cross verify 140 operation.

Service 105 can also be tasked with performing a number of other operations using the acquired metric data. For example, in one scenario, service 105 can include a notification module 145 that can trigger the transmission of various notifications or alerts to an employee, supervisor, or some other entity based on the analysis of the acquired metric data.

As one example, suppose a business would like to improve driver safety by avoiding driving hazards. If GPS movement data is acquired by service 105 and if the service 105 analyzed that GPS data and determined that a driver was driving too fast, then the notification module 145 can trigger an alert to the driver to inform him/her to slow down. Similarly, other alerts can be sent to the driver's supervisor to inform the supervisor of the infraction.

From this basic example, a skilled person can appreciate how any type of notification can be delivered. In some cases, the notifications can be informative, such as by providing reporting data. In other cases, the notifications can be warnings or alerts in an attempt to prevent or stop certain behavior that is currently occurring or that is predicted will occur. In some cases, the notifications might be proactive in which they can include a modification to an existing plan, where that modification results in improved performance (e.g., perhaps a new route is computed for a driver because a wreck has been detected). In some cases, the notifications can be recognition of good behavior, such as perhaps by providing an award or positive reinforcement to a user.

Service 105 can also include a score module 150. The score module 150 is tasked with generating an evaluation score for an individual, such as perhaps an employee, though other types of individuals can receive scores. For instance, the disclosed principles can be employed in a competitive scenario, such as in a team or sporting league. The principles can be employed within a family unit, where each family member is tasked with performing different family roles and responsibilities. The principles can be practiced in any scenario where it is desirable to track and incentivize behavior, including classrooms, work environments, sporting activities, and so forth.

The score module 150 further analyzes the acquired metric data and generates an evaluation score based on that metric data. For instance, the score module 150 can categorize received metric data as being generally positive, generally neutral, or generally negative. Of course, other categories can also be used. The service includes intelligence for classifying and categorizing the metric data. In some instances, the metric data might include text. Optionally, the service can include a natural language processing (NLP) engine that analyzes the text. The NLP engine can provide structure to the text and can optionally provide a sentiment or classification rating to the text. In this manner, unstructured text metric data can be provided with structure and can be classified in a manner so as to contribute to a user's evaluation score.

As used herein, a "positive" action is one that increases a user's evaluation score. A "neutral" action is one that results in substantially no change to the user's evaluation score. A "negative" action is one that decreases a user's evaluation score. The service (and in particular the score module) can include intelligence for classifying actions into different categories. Optionally, the service can include a list of predefined actions that constitute positive, neutral, or negative. The ML engine of the service can analyze new metric data and compare and contrast it to the existing data that has already been classified. The ML engine can then attempt to classify the new metric data into one of the existing categories based on the ML engine's past training/learning.

If metric data indicates a positive action, then the resulting score can reflect such. Similarly, if the metric data indicates a neutral action, then the resulting score can reflect such. To complete the example, if the metric data indicates a negative action, then the resulting score can reflect such. Further details on the scoring mechanisms will be provided later. In any event, the score module 150 is able to evaluate and weight metric data to generate a score for an individual or perhaps for a group of individuals.

Service 105 also includes or utilizes a performance module 155. The performance module 155 is designed to evaluate an individua's evaluation score and that individual's performance and to map or translate that score into a stimulus factor, which can optionally be in the form of a compliment, monetary bonus, gift card, vacation, or some other scalable reward.

For instance, a number of performance goals 160 can be specified. Performance module 155 can conduct a performance conversion 165, which measures or evaluates the individual's performance, as determined by that individua's score, against the performance goals 160. Optionally, a number of different weighting factors or criteria, as shown by weights 170, can be used as well, to translate the score to an objectively determined stimulus factor.

In some instances, performance goals 160 are generated by a human user while in other instances, the performance goals 160 are generated by a machine learning engine. Optionally, the embodiments can record and maintain previous performance goals. When generating new performance goals, these previous performance goals can be consulted. In some cases, a version or variant of a previous performance goal can be adopted as a new performance goal. The embodiments are able to track trends over time, including trends of performance goals over time. A machine learning engine can analyze the trends and can predict or generate new performance goals that correspond to the tracked progression, trend, or other grading methods.

Suppose a performance goal is set, where that goal is that an individual maintains a safe driving record for a business. That individual's performance may then be tracked over a period of time. In some instances, the individual drives a truck exactly at the speed limit, resulting in a neutral contribution to his/her score. In some instances, the individual drives the truck slightly over the speed limit, but not in an excessive manner, resulting in a slight negative contribution to his/her score. A majority of the time, however, the individual drives the truck slightly under the speed limit, resulting in a positive contribution to his/her score.

Suppose the desired score to achieve the performance goal is set to be at least a particular value (e.g., say 75). Further suppose the individual's score ends up being above that value (e.g., say 82). The delta between the two scores can be converted or translated to an actual dollar value (or some other reward) that can operate as an incentive to drive the user's behavior. For instance, a mapping algorithm can be defined, where this algorithm performs the translation.

As one example, suppose the mapping algorithm is a step-based algorithm. Scores that are within 5 points of the baseline score are translated to a first stimulus factor. Scores that are within 5 points relative to the first step are translated to a second stimulus factor. Scores that are within 5 points relative to the second step are translated to a third stimulus factor, and so on.

As another example, the mapping algorithm (e.g., the performance conversion 165 from FIG. 1) can follow different patterns or trends. For instance, the mapping algorithm can optionally be a linear algorithm with a 1:1 mapping relationship. In some cases, the mapping algorithm can be parabolic. For instance, a user might be rewarded with a higher stimulus factor as that user's score continues to increase. Thus, users may be better incentivized to dramatically increase their respective scores. As another example, the mapping may score individuals in a team situation on a curve against a team score. An individual can see his/her score against or within the team score. Team incentives can be provided and may be based on improvement of the curve parameters.

With reference to the step-based algorithm example, the user's score would fall within the second category or step and would thus receive the second stimulus factor. Thus, the individual would be rewarded with the second stimulus factor, which can be a defined dollar amount, such as in the form of a bonus. Thus, the evaluation score can be used to incentive behavior by rewarding actual dollars to employees or individuals.

The performance of the individual is gauged against the defined performance goals 160. Similarly, a defined algorithm can be used to convert the score, or at least the delta relative to a baseline score, to determine how much of a stimulus factor the individual is to receive.

In some cases, different weights (e.g., weights 170 from FIG. 1) or weighting parameters can be applied. For instance, for actions that are related to the safety and well-being of individuals, more strict or higher weights might be applied to the conversion process. On the other hand, actions that have no safety bearing, such as purely administrative acts, might have lower weights applied. For instance, an individual that completes his/her daily paperwork might have a lower weight applied to his/her delta score as compared to an individual who maintains a good safety rating.

In some cases, the weights 170 are manually defined while in other cases, the weights 170 can be defined by a machine learning engine. For instance, the machine learning engine can analyze historic performance and can determine which actions on the part of the users or employees improved performance the most (or by a threshold amount). The actions that led to that increased performance can be identified. When those actions are subsequently performed by users, the embodiments can optionally weight those actions to a higher degree in an effort to incentive the performance of those actions, thereby leading to an increased score.

In some cases, the embodiments can notify users that, for a limited amount of time, the performance of a particular action might contribute heavily or more significantly to their score. As an example, suppose the embodiments determine that, based on historical data, employees have not been completing their paperwork on time. The embodiments can trigger an alert that is sent to the employees. This alert can inform the employees that if they complete their paperwork within a specified time period, then they will be awarded an increased score. From this example, a skilled person will recognize how the embodiments can provide time-limited incentive programs or options that can be performed in an attempt to significantly increase a user's score over a relatively short period of time.

Some of the metric data can also include images. In some cases, the images can be uploaded directly to service 105. For instance, an employee can upload a photo from a company device. The service can utilize device geolocation to automatically identify a particular client to which the image is associated, based on the GPS coordinates (e.g., if the location where the image was take is known to be the client's worksite, then the embodiments can capitalize on that information to perform various automatic actions). The service can then automatically upload the image to the client's directory in the service's database.

Thus, instead of an employee having to manually select a client's file, the embodiments can analyze the attributes of the image (e.g., timestamp, GPS coordinates, etc.) and/or attributes of the user who took the image (e.g., the embodiments can review the user's calendar, and if the calendar indicates that the user will be located at a client's site, then the image is likely associated with the client) and automatically identify the client and then upload the image to the client's file. Similar operations can be performed for other types of data and not just image data (e.g., documents, files, videos, audio, etc.).

The embodiments are also able to compile data to produce objective performance reports for users. Individual performance can be monitored and conveyed via graphics and perhaps even games. Furthermore, the embodiments can facilitate training operations. For instance, the embodiments can detect when an employee might need additional training on a task. This detection can optionally be performed by analyzing the employee's metric data, which can be used to indicate or to infer the employee's performance.

The embodiments can then facilitate an audio, video, or some other presentation training seminar for the employee. Doing so helps reduce the learning curve and can improve employee performance. The embodiments can also monitor performance while the employee engages in other activities, such as driving. During this driving time period, the embodiments can trigger the playback of the audio training session so that the employee can optionally and safely multi-task. Optionally, a user's evaluation score can be further increased based on the engagement level of the employee with the training seminar.

As described throughout this disclosure, the embodiments provide a reward based mechanism to incentivize behavior. Employees, teams, and users can work towards a common goal to obtain a pledged reward (i.e. the stimulus factor). The stimulus factor can be in the form of cash, gift cards, vacations, or other rewards that scale to meet profitability and productivity goals.

The embodiments also enable individuals and groups to compete or to play against one another. The embodiments can provide interactive group challenges and graphics. These games can be family friendly or work friendly and can be used to review standards, knowledge, or any other desirable aspect.

Users can beneficially be monitored in the field or even at the desk. The embodiments beneficially grade employees' performances using objective performance standards. The resulting rewards are consistently applied without bias and lead to improve performance across the board. One will appreciate how the disclosed principles can be practiced in any environment, including a work environment, a home environment, a classroom environment, a sporting environment, and so on. Students in a classroom can be monitored and their performances can be assessed. The embodiments can integrate different types of learning methods, such as audio or visual learning, to facilitate the progression of the students. Different classrooms can compete against one another using the disclosed features. Different families or even members within a family unit can compete against one another. Transparent expectations can be established, and desired performance goals can be worked on.

Example User Interface

Figure 2A:
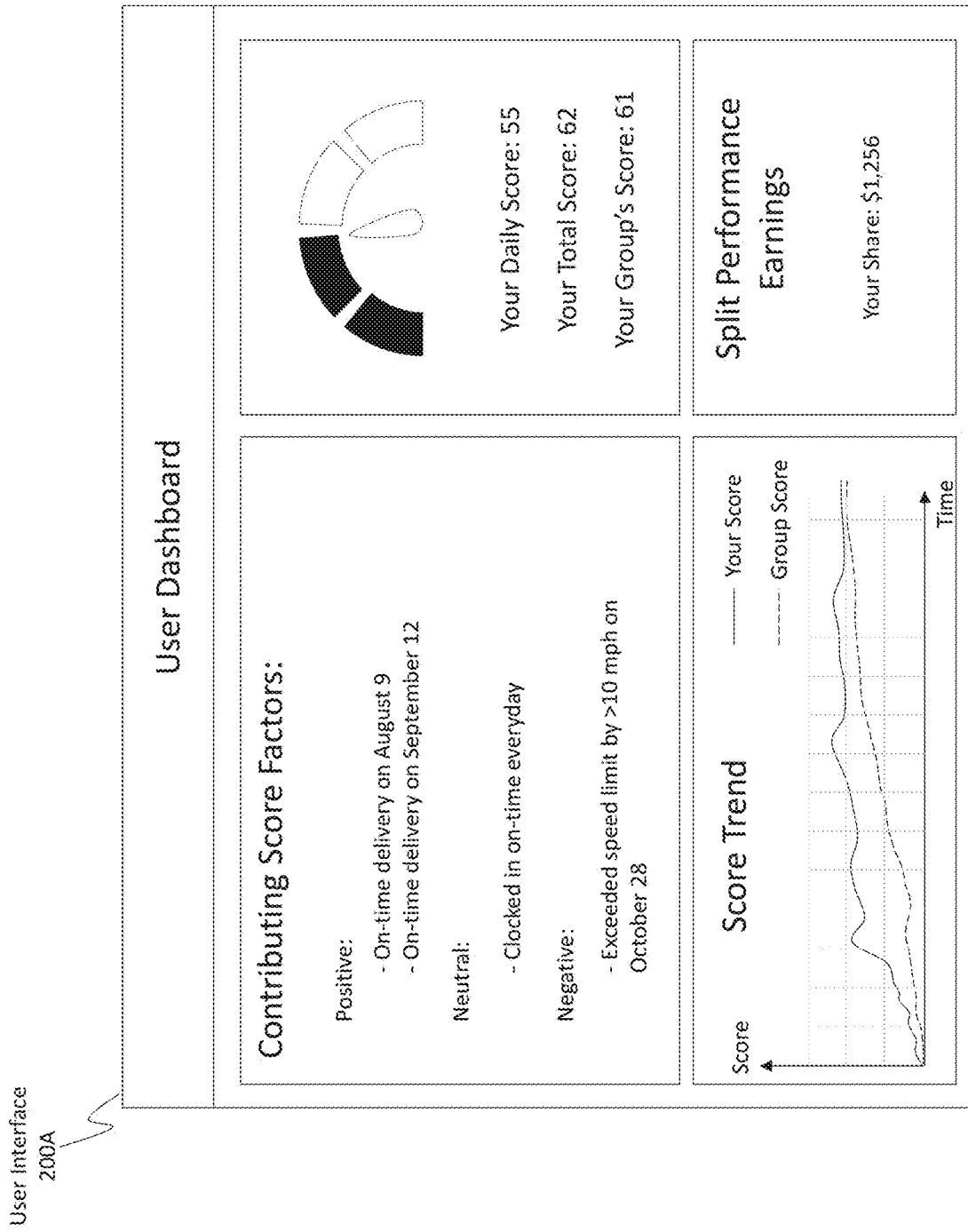
FIGS. 2A and 2B illustrate example user interfaces that can be surfaced or displayed to a user.

FIG. 2A shows an example user interface 200 that can be surfaced or displayed by service 105 of FIG. 1. User interface 200 is shown as including various different portions. For instance, user interface 200 includes various factors that contributed to the user's score. Those factors included positive factors, neutral factors, and negative factors.

The positive factors are listed as follows: "On-time delivery on August 9" and "On-time delivery on September 12." The neutral factor is listed as follows: "Clocked in on-time everyday." The negative fact is listed as follows: "Exceeded speed limit by >10 mph on October 28." These different factors are all obtained via service 105 of FIG. 1 and are obtained from different third-party applications that provided metric data. The service is able to categorize or classify the metric data, such as by being positive, neutral, or negative. The service is also able to infer various events that may have happened with regard to the metric data.

User interface 200 also shows a score for the user. In this case, the score has various parts. Here, the score includes a "daily" individual score, a "total" individual score, and a "group" score. The daily score is shown as being a value of 55, perhaps out of 100. The daily score may be computed based on metric data that is acquired within a single day time period. Optionally, the illustrated score "gauge" can reflect the daily score, the total score, or the group score. The value 100 is but one example. Some embodiments avoid setting an upper limit to the number of points an individual can earn. Points can reflect an individual's score against a top-scoring employee or against a bottom-scoring employee. In some cases, a comparative scale can be used.

The total score can be an aggregation of multiple day scores. Here, the total score is shown as being a value of 62. The group score can be an aggregation, combination, or average of scores from multiple users who are part of the same team or group. In this case, the group score is shown as being a value of 61.

Different groups or teams can optionally compete against one another in an effort to achieve the highest score. The team that achieves the highest score can optionally be rewarded the highest stimulus factor. The embodiments are able to facilitate different challenges and can define different performance goals for the different teams to compete. A group score can optionally be the average score of all of the team members in a group. One will appreciate, however, how other techniques can optionally be used to generate the group score.

User interface 200 can also optionally display a score trend graph that plots out the trend of a user's score over a defined time period. In some cases, the graph can simultaneously plot out the user's individual score as it compares to the user's group score. In some cases, the graph can show the user's daily score, as it changes over the course of the day, or, alternatively, the graph can show the user's total score over a different time period.

User interface 200 can also show a so-called "split performance earnings" feature. This feature refers to the stimulus factor mentioned previously. Here, the user has earned, based on his/her "good" score, a stimulus factor that has a dollar amount equal to $1,256. This value can increase as the user continues to improve his/her score. In some cases, the value can decrease if the user's performance decreases. In some cases, the payout for this stimulus factor can occur on a defined payout time or date. The stimulus factor might fluctuate up or down until the payout date arrives. In some cases, the stimulus factor does not fluctuate through a specified time period, and rewards may be a pledged dollar amount from the company ahead of time. Additionally, in some scenarios, individual pay-out dollar amounts may not be reflected until the time period is over.

Figure 2B:
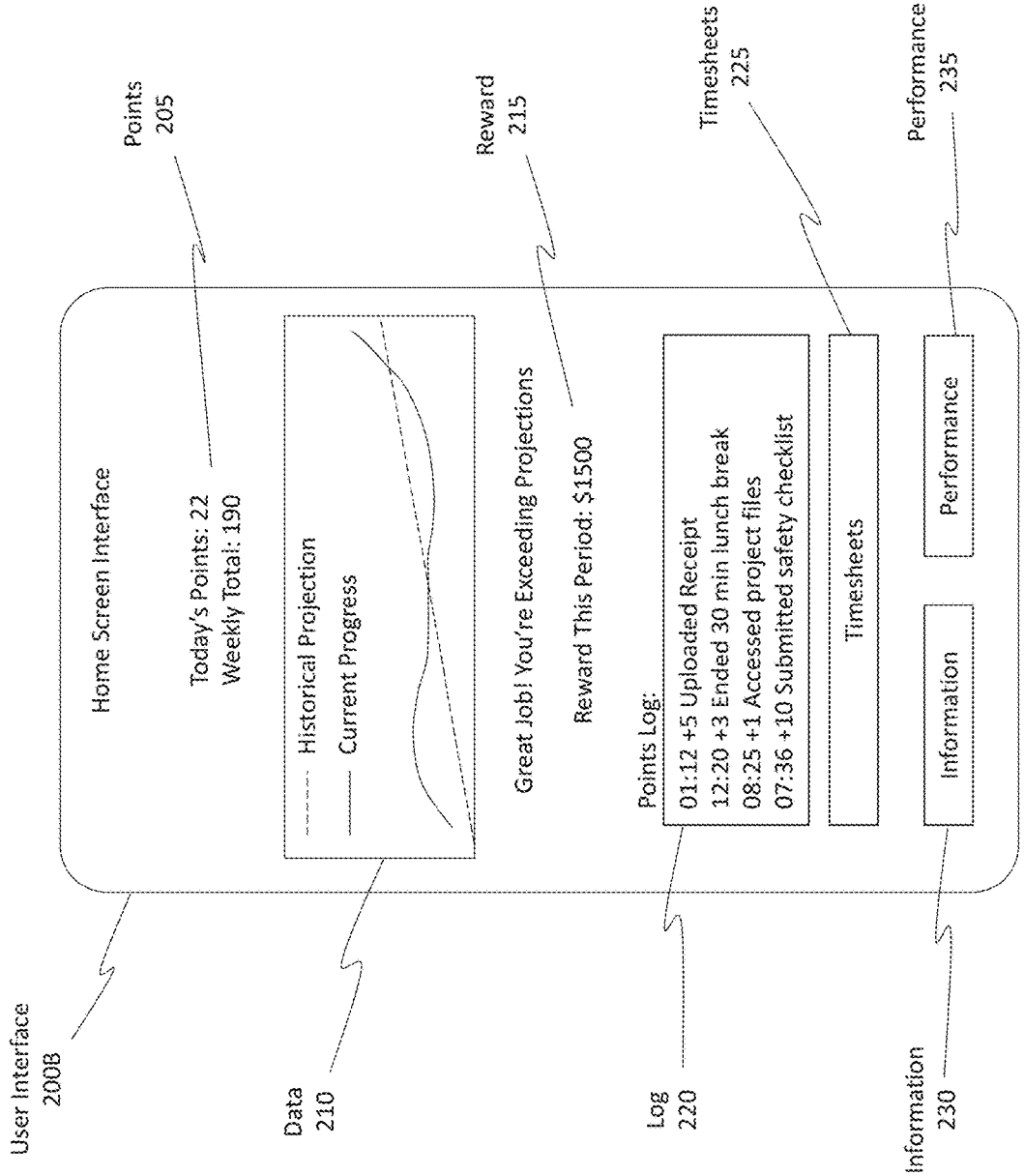

FIG. 2B illustrates another example user interface 200B, which can be displayed on any type of device, including a mobile device. User interface 200B includes a number of elements relating to points that can be earned as well as other features. To illustrate, user interface 200B shows points 205 that reflect the number of points earned in a given day as well as the number of points earned over a time period (e.g., a week).

User interface 200B also shows a chart of data 210 that corresponds to the user's points. The user's points can be tracked over time, as shown by the current progress plot. Additionally, the user's points can be compared against a historical projection.

Users are able to earn rewards based on their performance, as shown by reward 215. In this example scenario, this user has earned $1,500 so far during this time period. The log 220 provides an auditable record detailing how the user earned his/her points. Other supplemental data can also be surfaced to provide additional details regarding the user's progress. For instance, information about the user's timesheets 225 can be provided, additional information 230 (e.g., directory information, project file information, manual information, or forms information) can be provided as well as performance 235 data (e.g., competition data, rewards data, history data, and points log).

Performance Factors

Figure 3:
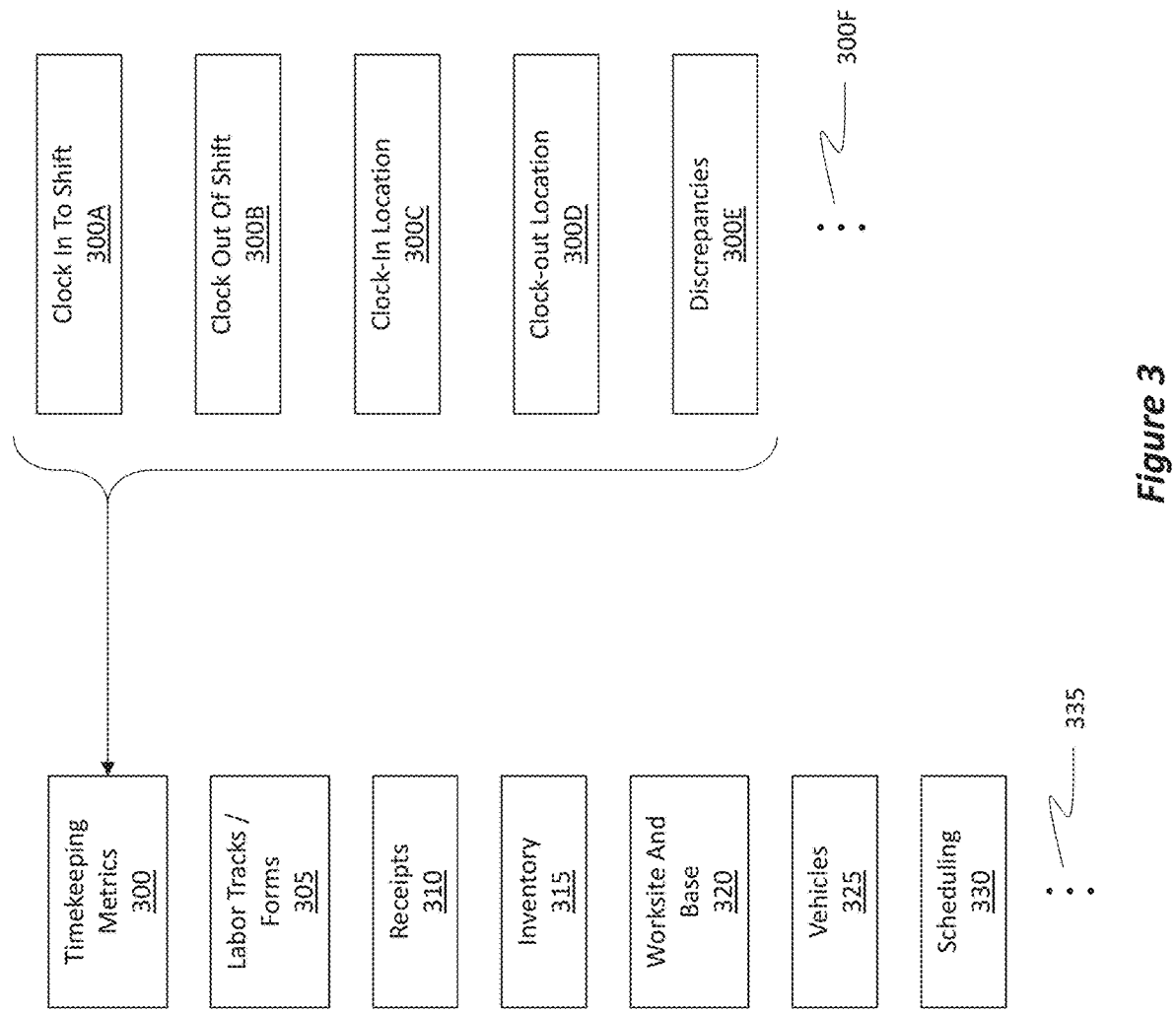
FIG. 3 illustrates various examples of different metric data that can be acquired and analyzed.

A skilled person will recognize how the embodiments can rely on any number or any type of different performance goals. That is, the service can measure or evaluate a user's performance against any number or type of different criteria, which can also be called performance goals. To evaluate the user's performance, the service acquires metric data that is reflective of those goals. FIG. 3 lists a few examples of different metric data that can be acquired by the service from the various different third-party applications.

The metrics used to generate or evaluate the performance factors include, but certainly are not limited to, timekeeping metrics 300, labor tracks/forms 305, receipts 310, inventory 315, worksite and base 320, vehicles 325, and scheduling 330. The ellipsis 335 demonstrates how other metrics can also be considered and acquired.

As a more specific example, consider the timekeeping metrics 300. FIG. 3 shows various parameters that can be included in the timekeeping metrics 300. As examples only, the timekeeping metrics 300 can include a metric that indicates when an employee clocks in to his/her shift 300A, a metric that indicates when an employee clocks out of his/her shift 300B, a metric that provides a clock-in location 300C, a metric that provides a clock-out location 300D, and a metric that tracks any discrepancies 300E. The ellipsis 300F indicates how other metrics can also be acquired.

These example metrics reflect data that a third-party application collects. The third-party application might collect an abundance of other data as well. If the small business entity was provided with the abundance of other information, the entity might likely become so overburdened with information that the information relevant to the business entity becomes unusable. The embodiments beneficially provide a service that allows an entity to select which specific types of information the business would like to extract, collect, and/or report. The service can then optionally use that information to then find third-party applications that could provide that information. In some cases, the service seeks out those applications itself while in other cases those applications are known beforehand and are provided in a list to the service.

In any event, the service is able to acquire metric data from different third-party or internal applications. The service can then use this metric data to evaluate a person's performance and to generate an evaluation score. That score can then be used to generate a stimulus factor for the person, as described previously.

The labor tracks/forms 305 metrics can refer to how labor is performed via documentation. For instance, an employee can optionally take a picture of the work environment to document the progression. This picture can be included in the metric data. Optionally, image analysis services can be employed to perform object segmentation on an image and to document the work completed over time and to measure the progress over time.

The receipts 310 refers to metrics that track and document purchases. Inventory 315 refers to metrics that track and monitor the number of products that are available in a warehouse, for example. The worksite and base 320 refers to various aspects related to the location where work is being performed and the home location where a business is located. Vehicles 325 tracks and records any type of metric with regard to a vehicle and its operation. Finally, the scheduling 330 can refer to any type of metric that details when events are to occur.

FIG. 4 illustrates an example table 400 focused on the timekeeping metrics 300 and how those metrics can be converted, mapped, or translated to values or categories that influence a user's evaluation score. For instance, consider the "clock in to shift" metric. FIG. 4 shows five different options for how that metric can be classified and can be used to influence a user's evaluation score. Those options include the following: "minus 5," "minus 3," "zero," "plus 3," and "plus 5." For instance, a metric that falls in the "minus 5" option or category results in a decrease of the user's evaluation score by a value of 5. Similarly, a metric that falls in the "plus 5" category results in an increase of the user's evaluation score by a value of 5.

As some specific examples, if an employee does not clock in for a shift, that metric will be classified as belonging to the "minus 5" category. If an employee clocks in 15 or more minutes late for a scheduled shift, that metric will be classified, mapped, or translated to the "minus 3" category. If an employee clocks in within +/−5 minutes of the scheduled start time, then that metric will be classified to the "plus 3" category. To complete the example, if an employee clocks in 10 minutes before the start of the shift, then that metric will be classified to the "plus 5" category. FIG. 4 shows various other examples of how metrics can be mapped into different evaluation score categories, which then influence the generation or update of the user's evaluation score.

In a different example, FIG. 5 illustrates a scenario that can be followed to determine a productivity ratio 500 for an employee based on that employee's timecard and fleet tracking data. The productivity ratio is a real example of the inefficiencies in everyday operations, which could be utilized as another metric that can be used to generate or influence an employee's evaluation score.

In the example shown in FIG. 5, an employee is shown as working 11:20 (e.g., see the top right hand chart). For the amount of time that the employee worked, only 8:51 (e.g., see top left hand chart) of it can be attributed to client billable time. The ratio between 8:51 and 11:20 results in the employee being 78.09% efficient, or having a productivity ratio of 78.09%. The employee's productivity ratio is another metric that can be evaluated and that can be used as a parameter for generating the employee's evaluation score. Upward trends or meeting certain productivity thresholds in the productivity ratio can be categorized as a positive action. In some scenarios, points may be earned for an individual's productivity ratio if that individual has a threshold productivity (e.g., perhaps 80% or higher of productivity). In some cases, points are not earned for an upward trend, but rather, points are earned on whether or not that threshold number (e.g., 80%) is hit each day.

Figure 6:
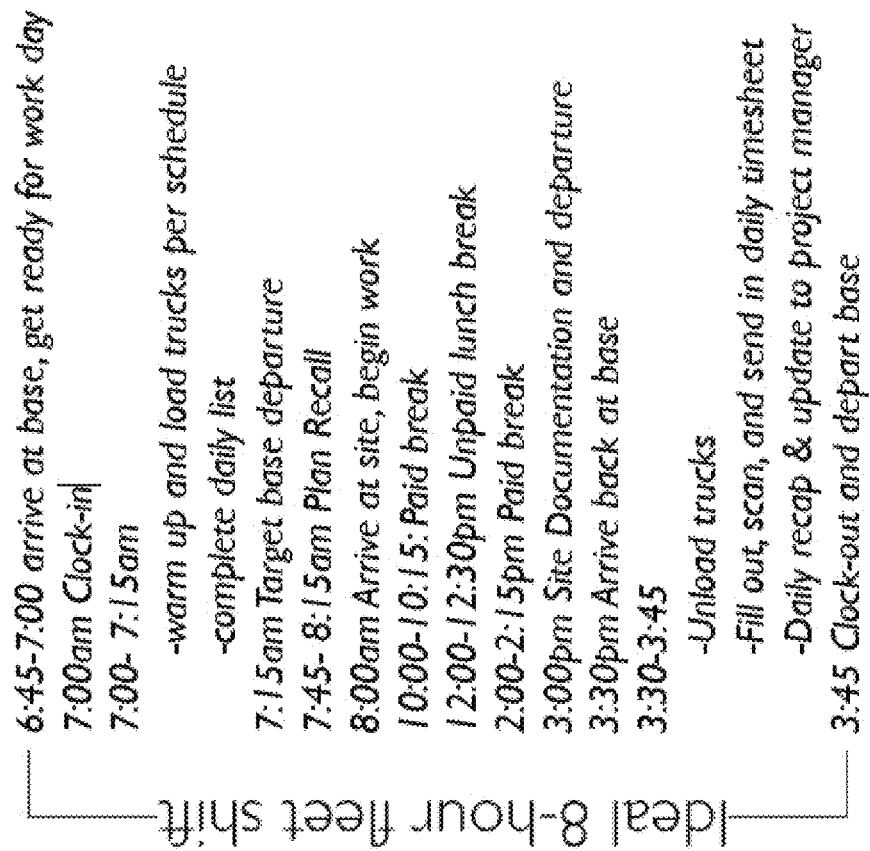
FIG. 6 illustrates an example of an ideal schedule for an employee.

In yet another example, FIG. 6 shows a so-called "ideal" 8-hour fleet shift in the form of schedule 600. That is, schedule 600 represents what would be a model for employees to follow.

Figure 7A:
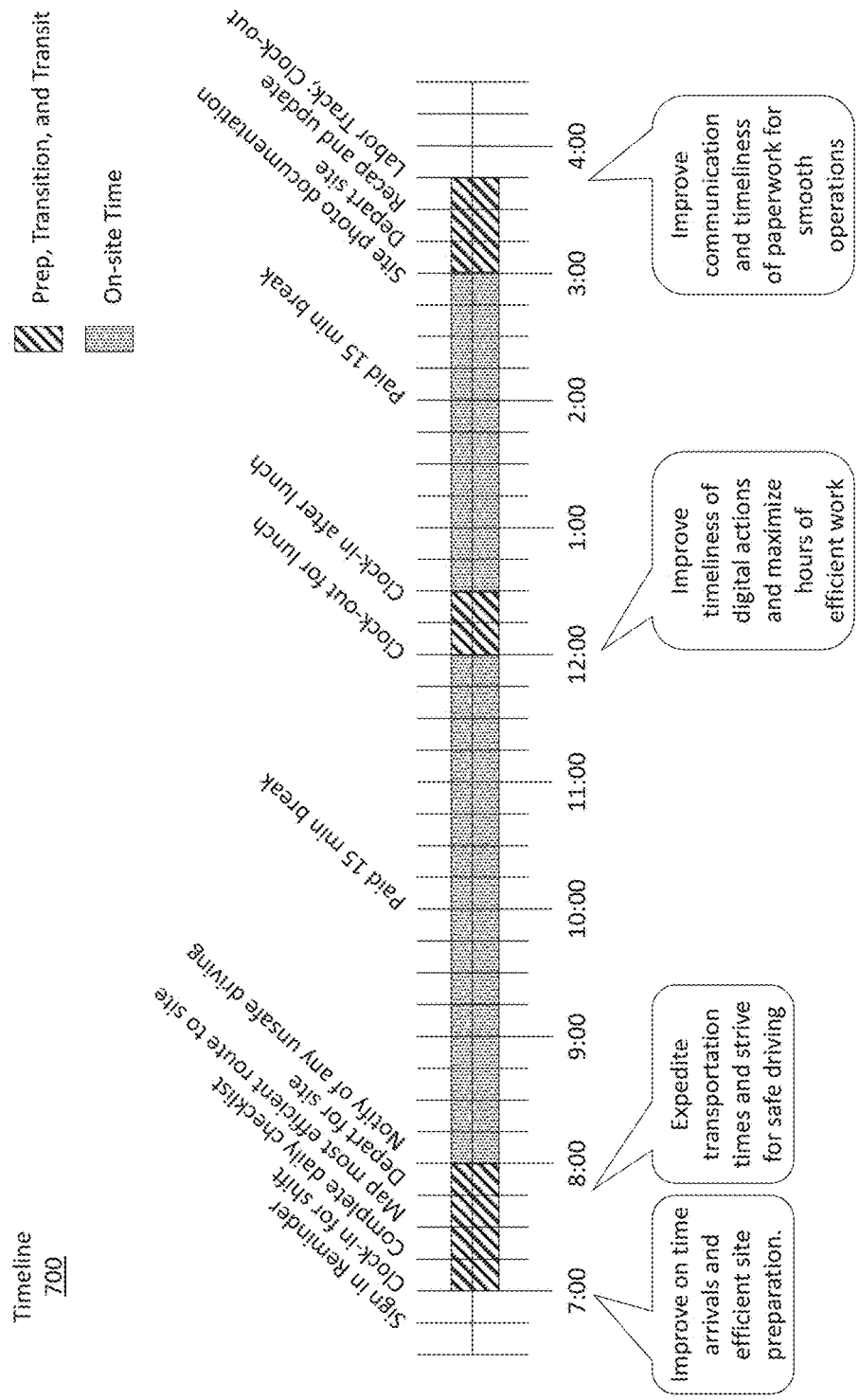

FIG. 7A illustrates another example timeline 700 representing an actual schedule for an employee, which highlights the targeted areas for improved efficiencies throughout the day. A skilled person will appreciate how this timeline 700 is simply provided for illustrative purposes only and should not be viewed as being limiting or binding in any manner.

Timeline 700 includes two main portions. One portion is labeled as "Prep, transition, and transit." The other portion is labeled as "on-site time." FIG. 7A shows various different areas or instances where improvement could be achieved in terms of efficiency in preparation, transition, or transit times on the employee's part, for example. These areas of improvement are presented in the bubble portions underneath the timeline 700.

For instance, one area of improvement has the following text: "Improve on time arrivals and efficient site preparation." The service is able to acquire the different metric data (e.g., the metrics that are listed on the upper portion of the timeline, such as the "clock-in for shift") and can analyze that data. As different events occur, the service can issue notifications or alerts to an employee in an attempt to immediately modify that employee's behavior. For instance, the service issued an alert at approximately 8:00, as shown by the "notify of any unsafe driving" alert.

As mentioned previously, different metric data can be acquired. The service can review and analyze this metric data to identify events. The service can also generate an evaluation score based on the metric data.

FIG. 7B shows an example scenario in which data can be mined or extracted, as shown by data extraction 705. As one example, different types of data can be collected, such as the following data: "Mon, 4/3 [OST] Nursery Crew I 07:00 am-03:37 pm 10:30." This log entry corresponds to the time an employee worked. Similarly, the following data can be collected: "07:02 AM Ignition On 8675309 Renton St., Seattle, WA." This entry corresponds to a location of work and the status of a vehicle. As shown on the left hand side of FIG. 7B, various filtering options can be selected or used to extract and analyze data. As a few examples, the following data filtering parameters are selected: "time of clock in"; "location of clock in"; "time of clock out"; "date of work"; "time of ignition on"; "location of ignition on"; and "verified location."

Cross Verification

Figure 8:
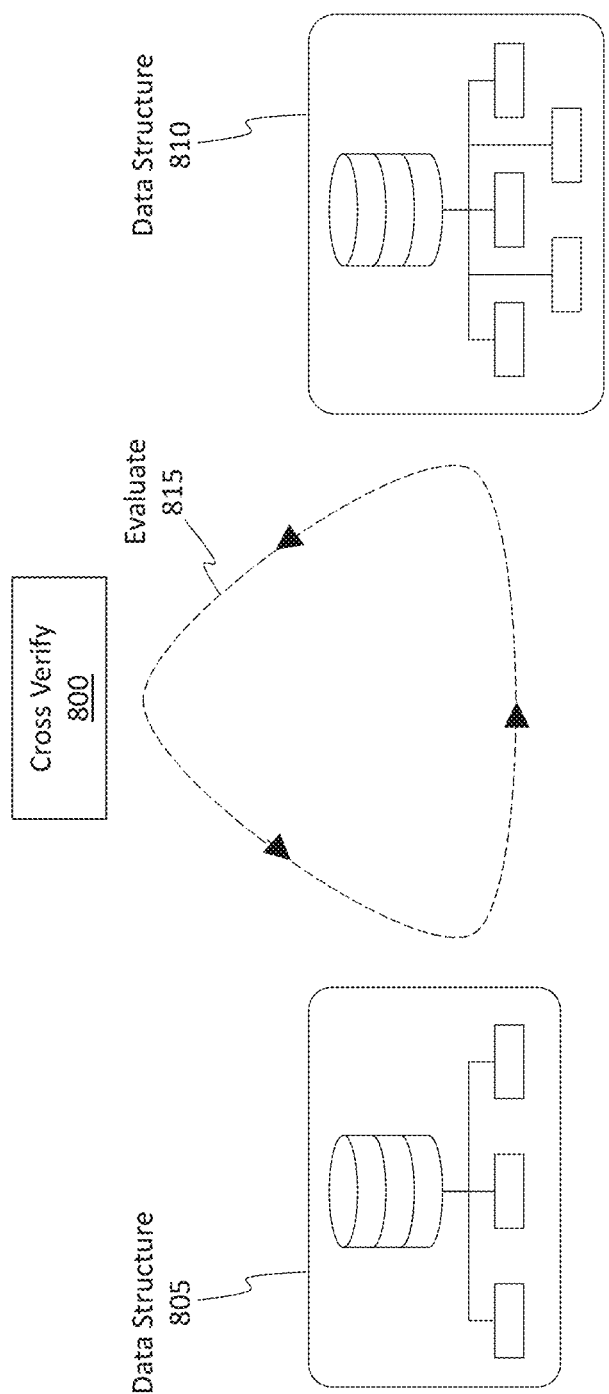
FIG. 8 illustrates an example of a cross verify operation that can be performed using different types of data structures.

FIG. 8 provides some further explanation regarding the cross verify 800 operation that was mentioned earlier (e.g., cross verify 140 from FIG. 1). The service can receive or access a first data structure 805 comprising first metric data. Similarly, the service can receive or access a second data structure 810 comprising second metric data. It may be the case that the two different sets of metric data generally describe the same event. Further, it may be the case that the structures or organization of the data structures 805 and 810 are different. Despite this difference, the service is able to evaluate 815 the metric data and perform the cross verify 800 operation in an attempt to ensure that the event actually did transpire in an anticipated manner. For instance, GPS data reflecting time of ignition on or the movement of a truck can be used to verify the clock in time of a driver who is driving that truck.

Any amount of data and any number of different data structures can be analyzed and compared by the service. In this regard, the embodiments are able to use data from different sources to authenticate or to verify that an event occurred. The different data can also be used to authenticate other data, such as in the scenario where the GPS data verified the clock in and GPS location and ignition on time of the truck driver.

Different types of data structures can be analyzed and received by the disclosed service. For instance, one data structure can be a table or database of information. Another data structure can be organized as timestamp data, GPS data, environmental condition data, audit log data, text data, chart data, image data, video data, array data, linked list data, stack data, queue data, hash tables, trees, heaps, graphs, and so on. Furthermore, the embodiments can analyze image data, video data, audio data, and alphanumeric data.

Competition(s)

Figure 9:
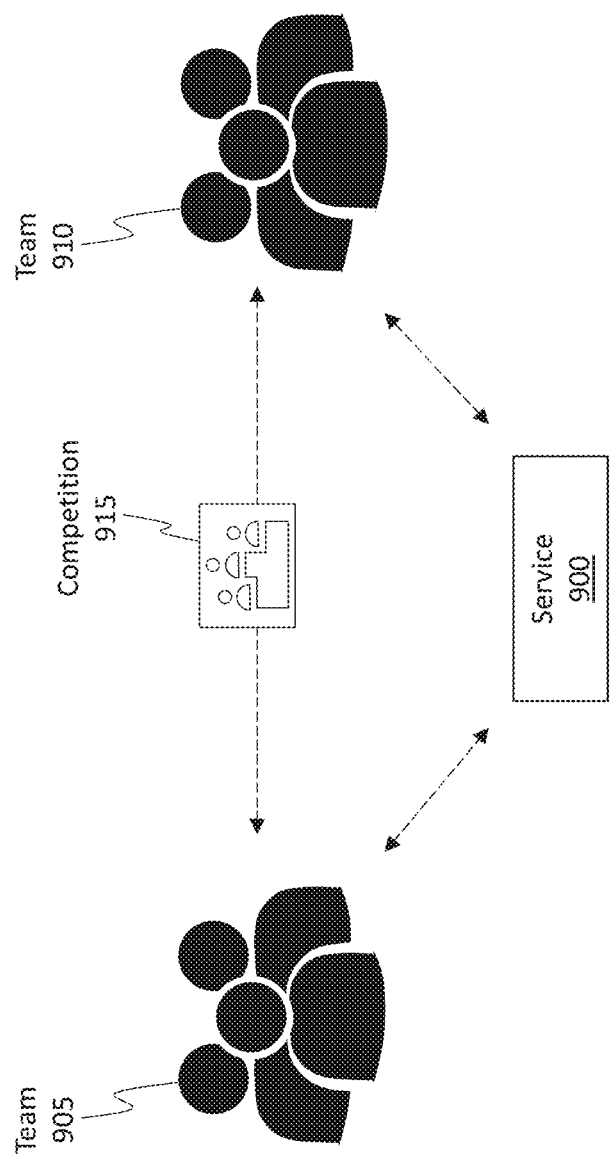
FIG. 9 illustrates an example of a competition that can be facilitated by the disclosed service.

FIG. 9 shows an example scenario involving a competition between multiple teams, where this competition can be facilitated by the disclosed service 900, which is representative of the service 105 from FIG. 1. FIG. 9 shows a first team 905 comprising any number of individuals and a second team 910 comprising any number of individuals. The service 900 facilitates a competition 915 between those two teams within a single entity, or among any number of different entities.

To do so, the service 900 can be used to generate a set of performance goals that the two teams will attempt to achieve. The teams will be evaluated using acquired metric data, and respective evaluation scores will be assigned to each team. In some cases, the team that produces the highest score can be deemed as winning the competition 915. The group or team scores can be an aggregation of the individual members' scores. In some cases, the group score can be an average score of the members' scores.

The teams can be formed from any type of unit. For instance, the team can be a family unit, the team can be a military unit, the team can be a work employee unit. Different teams can network together and can host or facilitate competitions using the service 900.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 10A:
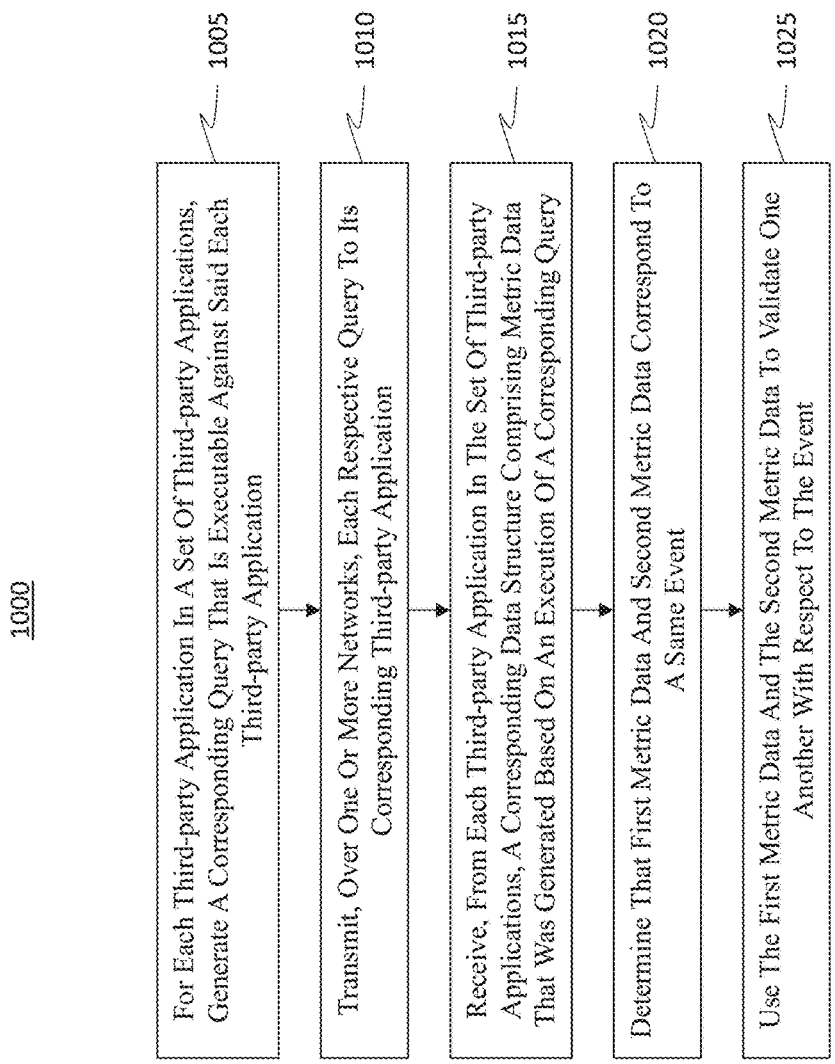
FIGS. 10A and 10B illustrate flowcharts of an example method for provisioning a central, cloud-based service (i) that generates customized queries for execution against a plurality of third-party applications to collect certain metric data and (ii) that generates an evaluation score based on the collected metric data.
Figure 10B:
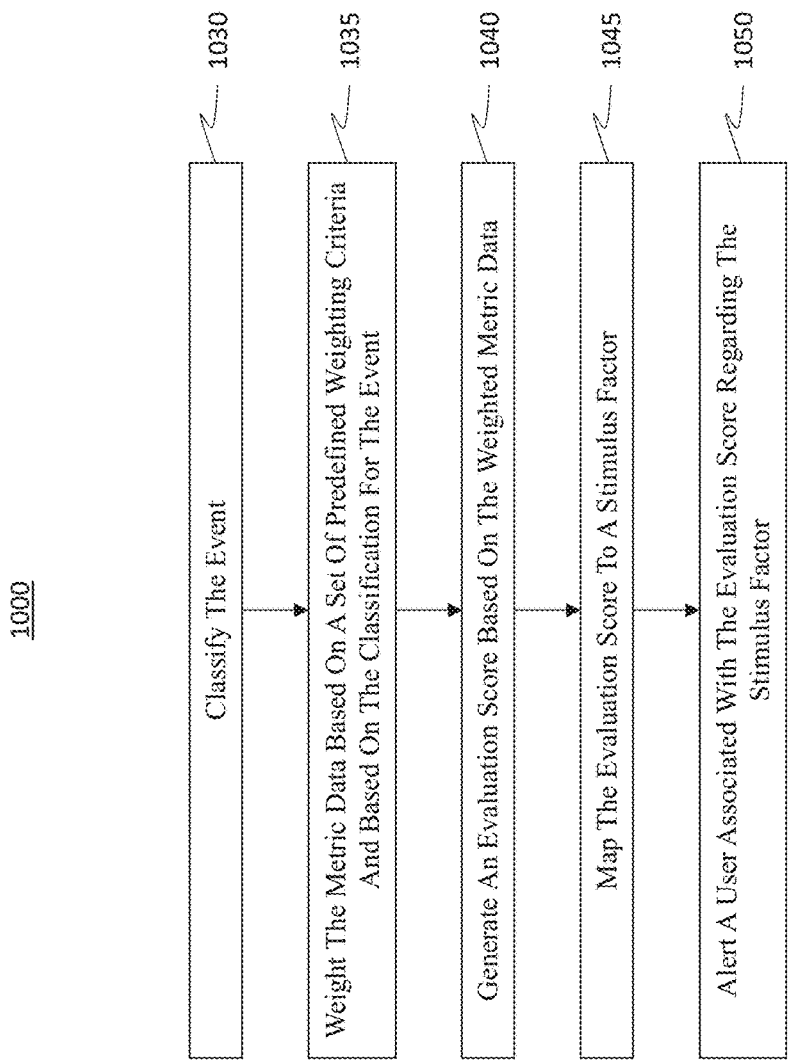

Attention will now be directed to FIGS. 10A and 10B, which illustrate flowcharts of a method 1000 for provisioning a central, cloud-based service (i) that generates customized queries for execution against a plurality of third-party applications to collect certain metric data and (ii) that generates an evaluation score based on the collected metric data. Method 1000 can be performed by the central, cloud-based service, such as the service 105 from FIG. 1.

Method 1000 includes an act (act 1005) of generating, for each third-party application in a set of third-party applications, a corresponding query that is executable against that third-party application. The corresponding query is designed to extract metric data from that third-party application, perhaps metric data that is of a pre-selected type based on parameters included in the query. The query generating process can be performed via use of corresponding application programming interfaces (APIs) that are provided to facilitate metric data extraction from the set of third-party applications. For instance, the API(s) 110 from FIG. 1 can be used.

Act 1010 includes transmitting, over one or more networks or network connections, each respective query to its corresponding third-party application. The networks can include a wide area network, a local area network, a telecommunications network, or any other type of network. In some cases, multiple different networks can be used simultaneously to transmit multiple different queries. In some cases, a first network is used to transmit data from the service and a second network is used by the service to receive data. In some cases, a first network can be used to transmit a first query. If, after a predefined period of time, metric data is not received in response to the transmission of the first query, the service can then send the query using a second network.

In some cases, the process of transmitting each respective query is performed on a periodic timeframe. For instance, queries can be transmitted every selected number of seconds, minutes, hours, or perhaps days. In some cases, the service is subscribed with the third-party application. Instead of the service initiating the poll of data, the application can optionally be tasked with transmitting the data to the service periodically or in response to the occurrence of a particular event or condition (e.g., new data has been generated by the third-party application).

Act 1015 includes receiving, from each third-party application in the set of third-party applications, a corresponding data structure comprising metric data that was generated based on an execution of the respective query. In this scenario, a first data structure, which includes first metric data, is received from a first third-party application. Similarly, a second data structure, which includes second metric data, is received from a second third-party application. Notably, the first data structure is different from the second data structure.

In one example embodiment, the first third-party application is one application selected from a group comprising a fleet tracking application, a time tracking application, a global positioning system (GPS) application, or a project management application. Optionally, the second third-party application can be a different application selected from that same group. Of course, other applications can be used as well.

As mentioned previously, the network connections can include multiple connections, such as a connection to a telecommunication network and a connection to a wide area network. Optionally, the first or second data structure can be received over the telecommunications network, and the other data structure can be received over the wide area network.

In some cases, the first third-party application is a GPS application operating on a mobile device. Consequently, the so-called first data structure is generated by the GPS application. Similarly, the second third-party application can be a time tracking application. Consequently, the second data structure is generated by the time tracking application.

Act 1020 includes determining that the first metric data and the second metric data correspond to the same event. This determination can be performed via a cross verify operation in which the different sets of metric data are analyzed and the event is identified. The metric data can then be cross verified against one another.

Despite the second data structure being different from the first data structure, the embodiments use (e.g., in act 1025) the first metric data and the second metric data to validate one another with respect to the event. That is, the cross verification process can be performed in act 1025. The second data structure can be different from the first data structure in a variety of ways. For instance, the amount of data can be different in the two data structures. Additionally, or alternatively, the first data structure can format the first metric data in a different manner than how the second data structure formats the second metric data. For instance, it may be the case that the first metric data is in the form of timestamp data while the second metric data may be in the form of global coordinates, or GPS data. The first metric data might be weather data, temperature data, timekeeping data, and so on, and the second metric data might be some other type of data.

Method 1000 continues in FIG. 10B. Act 1030 includes classifying the event that corresponds with both the first metric data and the second metric data. As a result, a classification for the event is determined. The classification can be any type of classification. For instance, the classification can indicate that the event is an administrative event, a work safety related event, a labor related event, and so on. In some example implementations, the first and second metric data can both describe a labor performance of an individual, and the same "event" can correspond to a labor event performed by the individual.

Act 1035 includes weighting the metric data. This weighting is based on a set of predefined weighting criteria. For instance, the predefined weighting criteria can include the level of weighting that is to occur. The example described in FIG. 4 in which the different categories (e.g., "Minus 5", "Minus 3," etc.) reflect different amounts of weighting can be indicative of this predefined weighting criteria. The weighting is also based on the classification for the event. For instance, if the event is classified as one that could potentially subject an individual to a health safety issue, then the weighting might be more severe or intense. Stated differently, it may be the case that the predefined weighting criteria include a weighting criterion for events classified as being health safety events, events classified as being administrative events, events classified as being labor events, or events classified as being paperwork events.

Act 1040 includes generating an evaluation score based on the weighted metric data. The evaluation score reflects how the individual performed with respect to a set of criteria or performance goals. The collected metric data can indicate how the individual performed, and the evaluation score can be generated based on that metric data. The evaluation score can be increased or decreased based on updated metric data. For instance, as new metric data arrives to the service, that new data can have an influence on the evaluation score. The evaluation score can be provided for an individual entity. Additionally, or alternatively, the evaluation score can be provided for a group of individual entities.

Act 1045 includes mapping the evaluation score to a stimulus factor. For instance, if an employee is productive/efficient, as evidenced by a high evaluation score, then some of the profits can be shared with the employee in the form of the stimulus factor (e.g., perhaps a monetary amount). Act 1050 then includes alerting a user associated with the evaluation score regarding the stimulus factor. In some cases, the alert can be triggered for transmission to the user in response to updated metric data being received. For instance, if the updated metric data indicates that a user is speeding, the alert can be triggered to instruct the user to slow down so as to potentially avoid reducing the user's evaluation score. In some cases, the alert can be transmitted to the user in response to the evaluation score being updated. For instance, if the score updates on an hourly periodic basis, then the user can optionally receive an alert each hour.

Accordingly, the disclosed embodiments bring about numerous benefits and advantages in data management and data analysis. The disclosed principles can be employed in numerous different environments and can be used to bring about great success and performance improvements, particularly for small businesses.

Optionally, a so-called internal "toolbelt" can also be used. The internal toolbelt encompasses tools and modules that are developed and that can be integrated into the disclosed analytics system and single user interface. This toolbelt helps to reduce the need for external API access and also allows to customize experiences by adapting only the tools that are needed.

Additional Details

FIGS. 11 through 18B provide some additional details regarding some of the features of the disclosed embodiments. It will be appreciated how these features can be incorporated with any of the other features recited in this disclosure.

Figure 11:
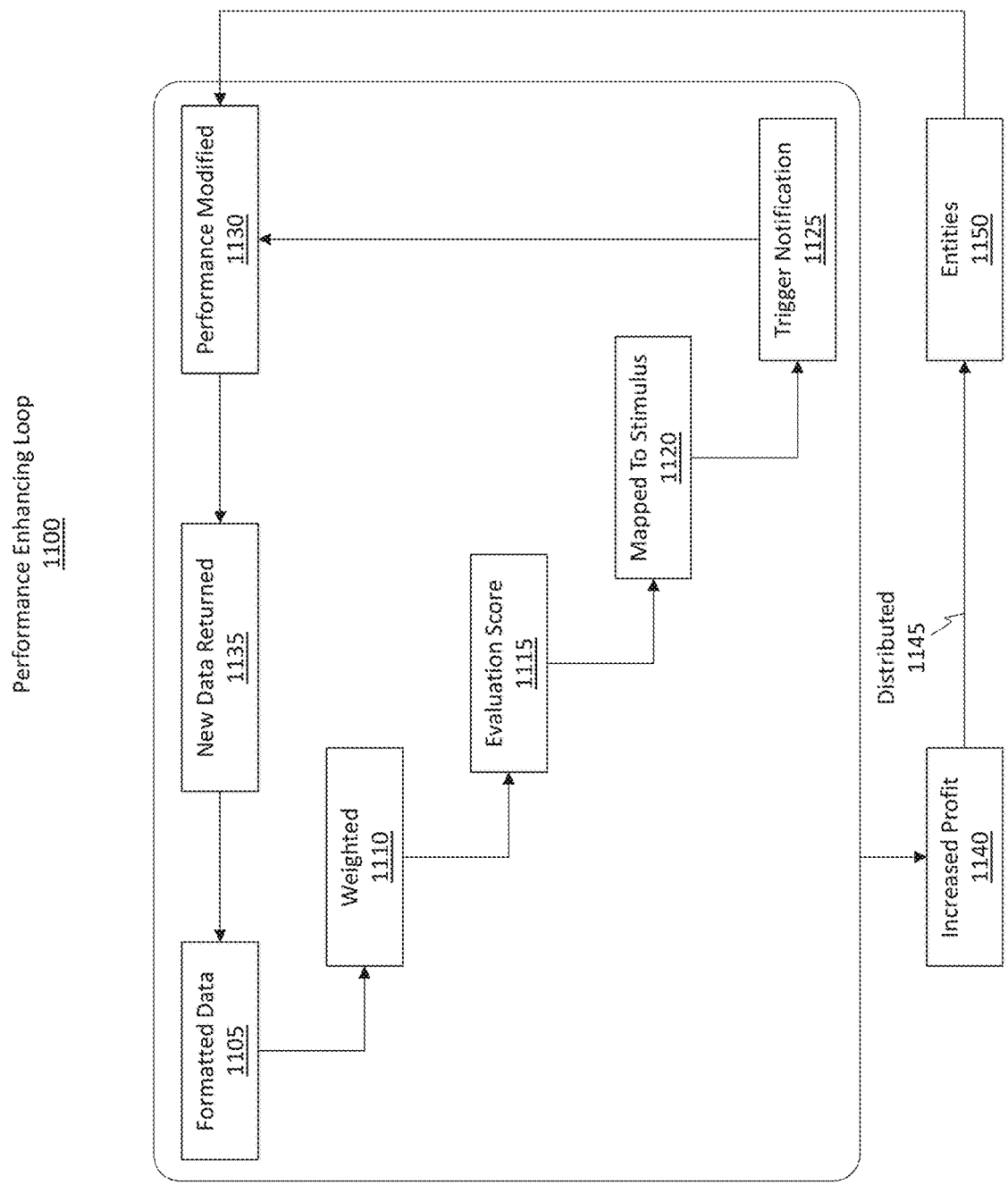
FIG. 11 a performance enhancing loop.

FIG. 11 shows an example scenario involving a performance enhancing loop 1100. Efficiency and even profitability can also be enhanced via this loop 1100. These enhancements can be achieved by practicing the disclosed principles.

Loop 1100 includes a step 1105 in which data is formatted. For instance, raw data may be collected and then organized or formatted into a specific structure or format. That formatted data is then weighted 1110 based on a selected number of parameters. An evaluation score 1115 may then be attributed to the data. In some scenarios, the evaluation score is then mapped to a stimulus 1120, such as a person, place, or perhaps a triggering event. A notification 1125 is then triggered.

Based on this notification, the user who was given the score may then modify his/her performance 1130. New data 1135 may then be collected based on the user's modified performance. The loop 1100 may then repeat.

In some scenarios, loop 1100 can result in increased profits 1140 being achieved, such as when the modified performance results in efficiencies or other improvements. These profits can then be distributed 1145 to various entities 1150, such as employees, owners, or the business. When these entities 1150 receive their rewards, they may also modify their performance 1130, potentially resulting in further enhancements.

Figure 12:
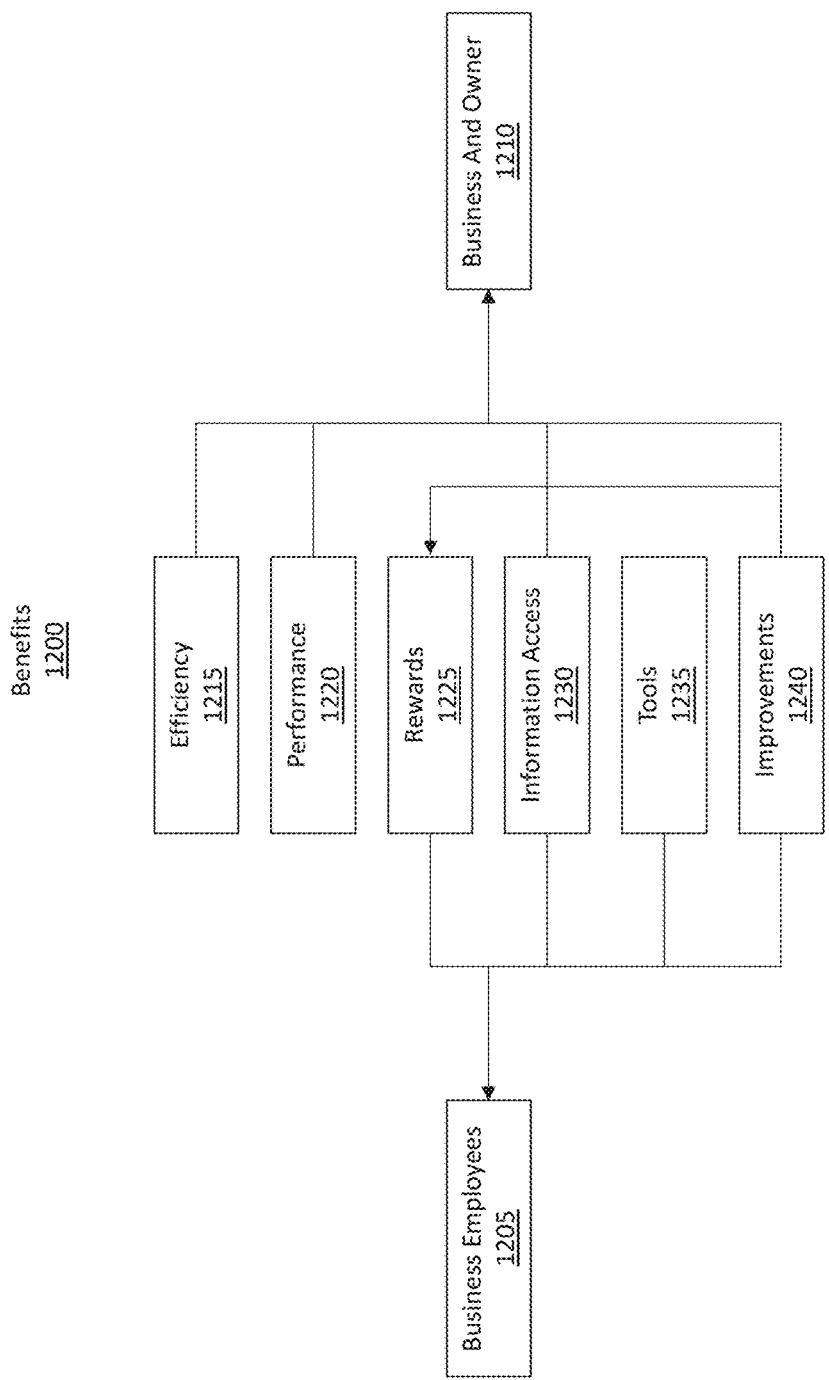
FIG. 12 illustrates various benefits that can be achieved by practicing the disclosed principles.

FIG. 12 lists a few example benefits 1200 that can be achieved and potentially provided to business employees 1205 and the business or owner 1210. Such benefits include, but certainly are not limited to, increased efficiency 1215, increased performance 1220 (e.g., improved ability to facilitate performance analysis and monitoring), rewards 1225, enhanced information access 1230, improved usage of tools 1235 (e.g., a centralized place for digital tools and task management), and other improvements 1240 (e.g., increased profits through efficiency management).

Figure 13:
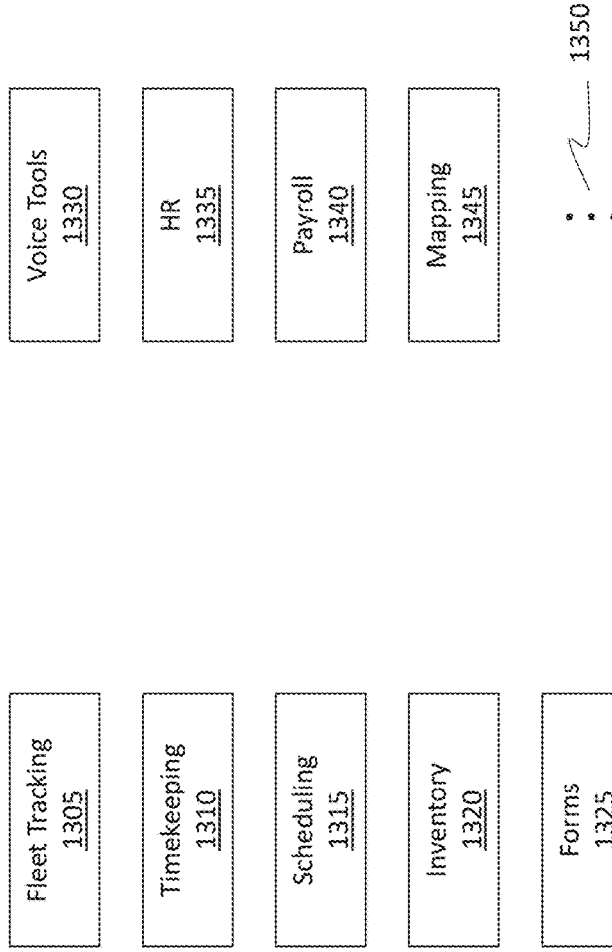
FIG. 13 highlights various integrations into which the disclosed embodiments can be used.

FIG. 13 shows various integrations 1300 into which the disclosed embodiments can be employed. Such integrations include, but are not limited to, fleet tracking 1305, timekeeping 1310, scheduling 1315, inventory 1320, forms 1325, voice tools 1330 (e.g., voice navigation, voice to text, and voice translations), human resources (HR) 1335, payroll 1340, and mapping 1324. The ellipsis 1350 demonstrates how the embodiments can be incorporated into any number of other APIs as well.

Figure 14:
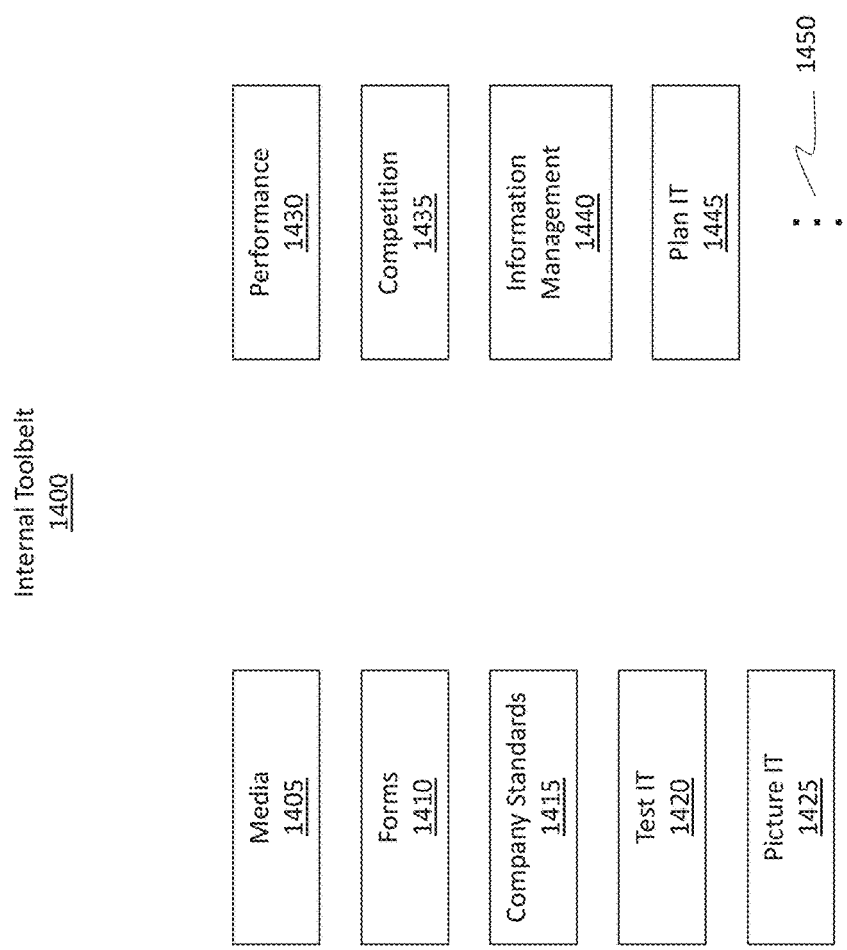
FIG. 14 illustrates details regarding an internal toolbelt.

FIG. 14 provides additional details regarding the internal toolbelt 1400. The internal toolbelt 1400 is a type of tool that can be used to assist a user in navigating content or in accessing content. By way of example, the internal toolbelt 1400 can be used to assist a user with accessing media 1405 (e.g., media upload and autostart), forms 1410, company standards 1415, test IT 1420 programs, picture IR 1425 programs, performance 1430 analytics, competition 1435 data, information management 1440, and plan IT 1445 programs. The ellipsis 1450 demonstrates how other features or tool can also be provided by the internal toolbelt 1400.

Figure 15:
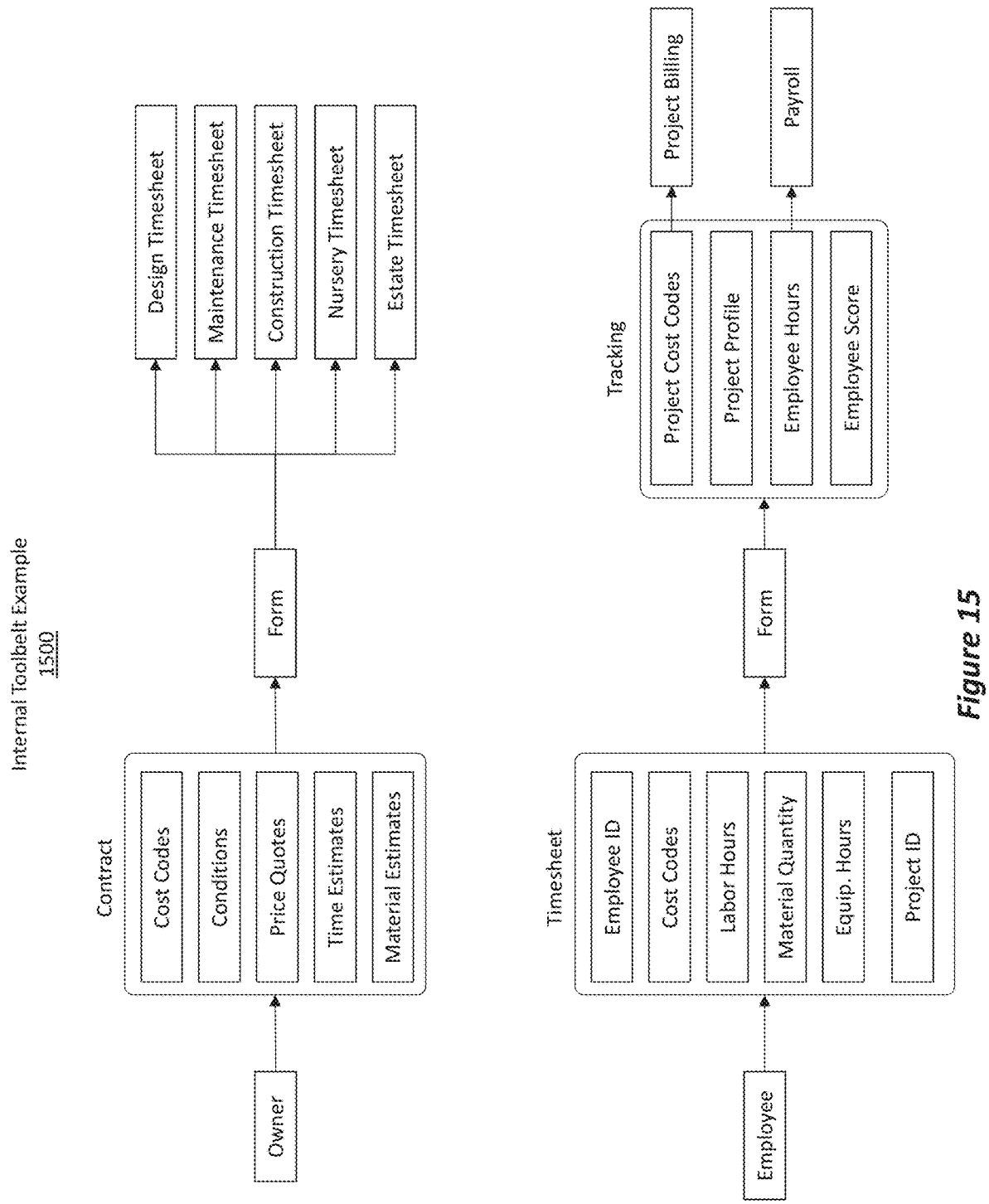
FIG. 15 illustrates further details regarding the internal toolbelt.

FIG. 15 shows an example 1500 of the internal toolbelt being used by an owner and an employee. In this example scenario, the internal toolbelt is providing options related to a timesheet and a contract.

The owner's example is related to the contract. Here, the internal toolbelt allows the owner to access cost codes, conditions, price quotes, time estimates, and material estimates. A form can be populated with that information. Various outputs can also be produced, such as a design timesheet, maintenance timesheet, construction timesheet, nursery timesheet, and estate timesheet.

The employee's example is related to the timesheet. Here, the internal toolbelt allows the employee to access an employee ID, cost codes, labor hours, material quantity, equipment hours, and project ID. A form can be populated with that information. Tracking data can also be provided by the internal toolbelt. This data may include project cost codes, project profile, employee hours, employee scores, project billing data, and payroll data.

Figure 16:
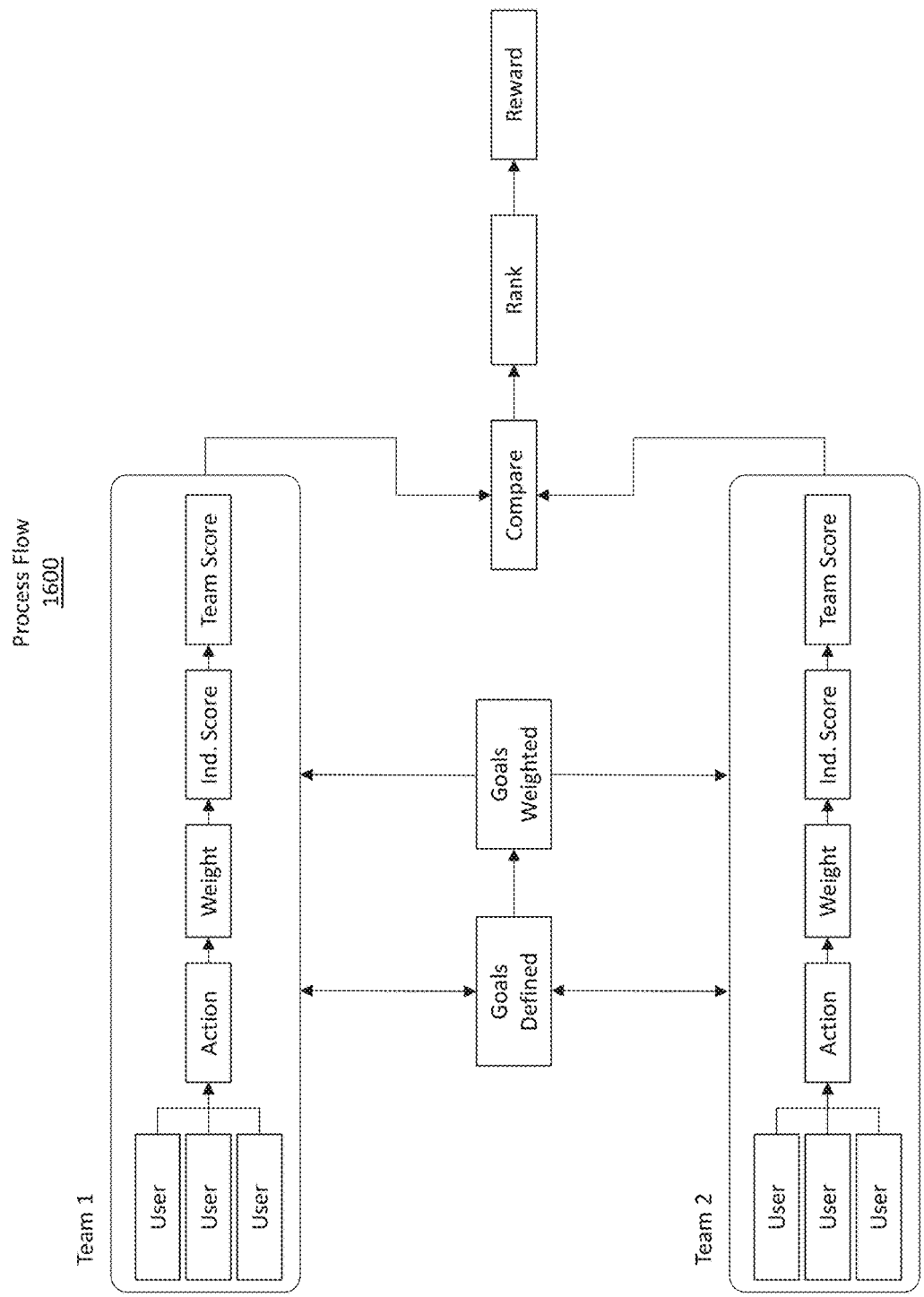
FIG. 16 illustrates an example process flow for rewards teams and/or individuals.

FIG. 16 illustrates an example process flow 1600 in which two teams (e.g., team 1 and team 2) are competing against one another. Each team has a number of users. Each user completes one or more actions. Those actions are weighted against certain competition performance goals. Scores for those actions are then calculated and assigned to each user. The individual user scores are processed to calculate a team score. The team scores are compared, the teams are ranked, and a reward is provided to the winning team.

FIG. 17 shows a household organization 1700 in which points can be earned by accomplishing various tasks. For instance, John earned 5 points when he did the dishes. Josh earned 3 points when the took out the trash. Additional points can be earned by performing pending tasks that have not yet been completed.

Figure 18A:
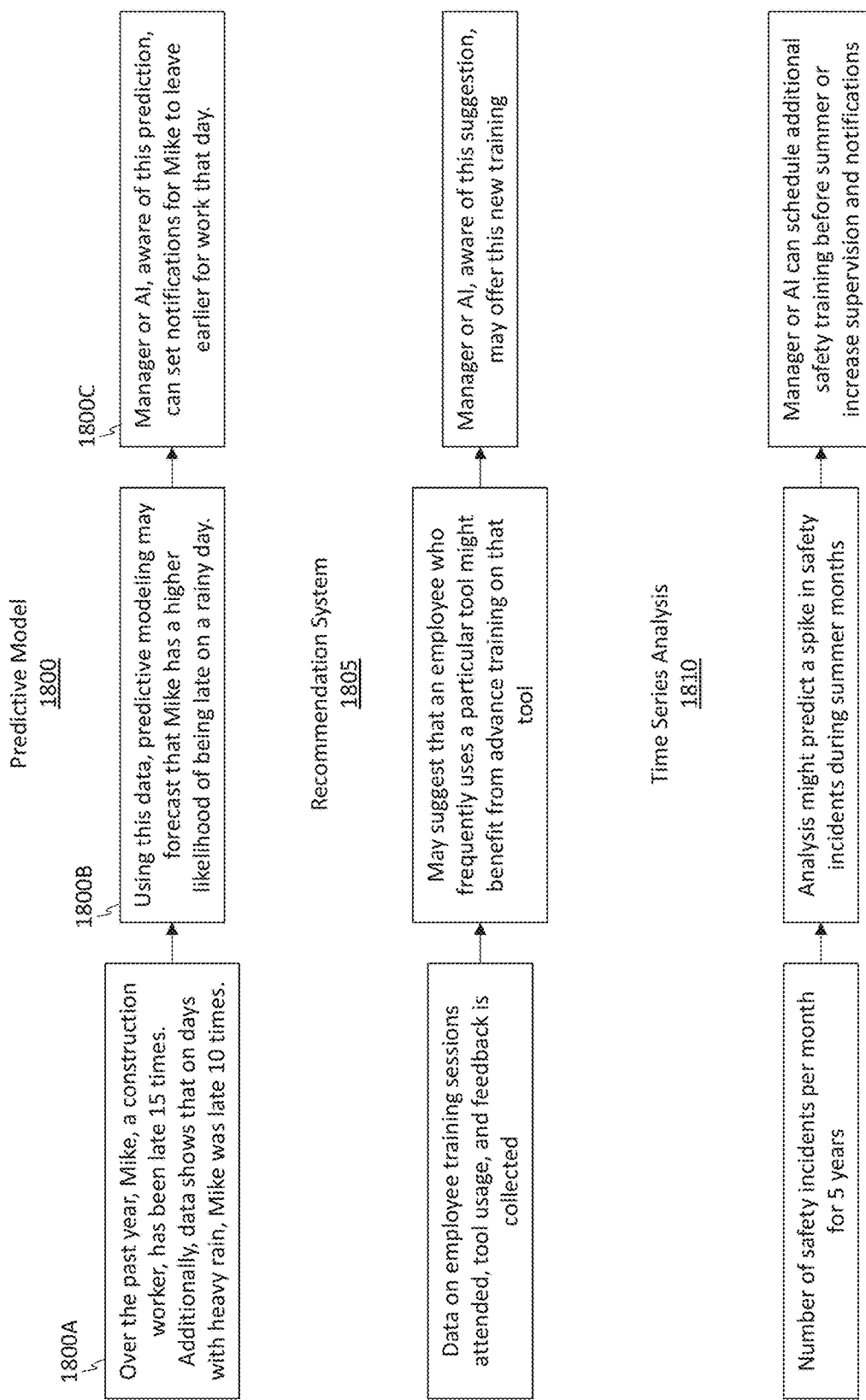
FIGS. 18A and 18B illustrate various models.
Figure 18B:
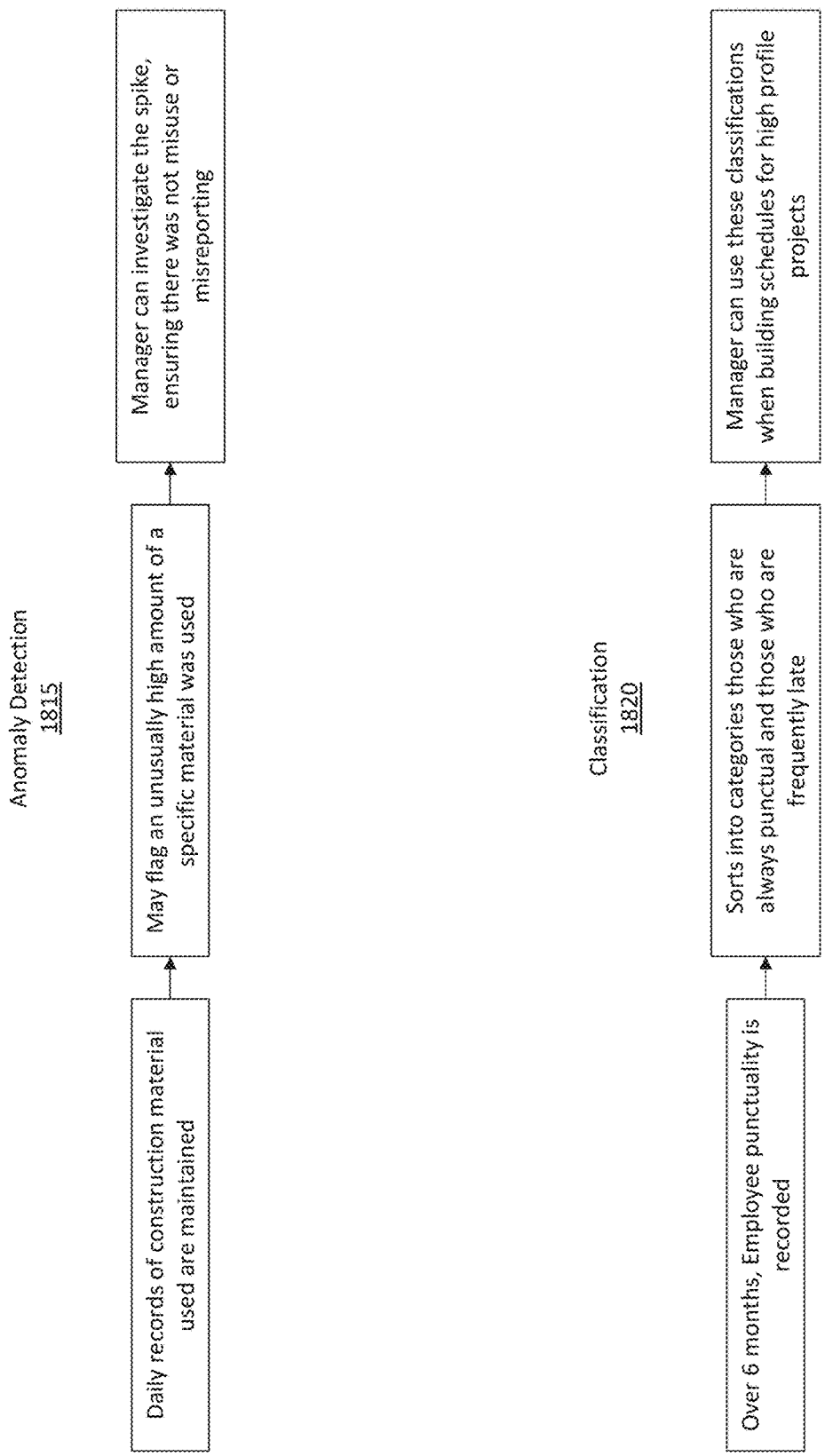

FIGS. 18A and 18B show various different model scenarios. The lefthand boxes represent data that is collected, the middle boxes represent a model analysis, and the righthand boxes represent an application of the output from the model. It will be appreciated how these are simply example aspects and should be viewed as being non-limiting.

FIG. 18A shows a predictive model 1800. This model can collect data, as shown by act 1800A. In this example scenario, the data is as follows: "Over the past year, Mike, a construction worker, has been late 15 times." "Additionally, data shows that on days with heavy rain, Mike was late 10 times." The model then executes using this data, as shown in act 1800B. For instance, using this data, predictive modeling may forecast that Mike has a higher likelihood of being late on a rainy day. The application step is shown in act 1800C. To illustrate, the manager or AI, aware of this prediction, can set notifications for Mike to leave earlier for work that day.

Other examples are shown in FIGS. 18A and 18B. These examples include a recommendation system 1805, a time series analysis 1810, an anomaly detection 1815, and a classification 1820, each with their corresponding descriptions.

Example Computer/Computer Systems

Figure 19:
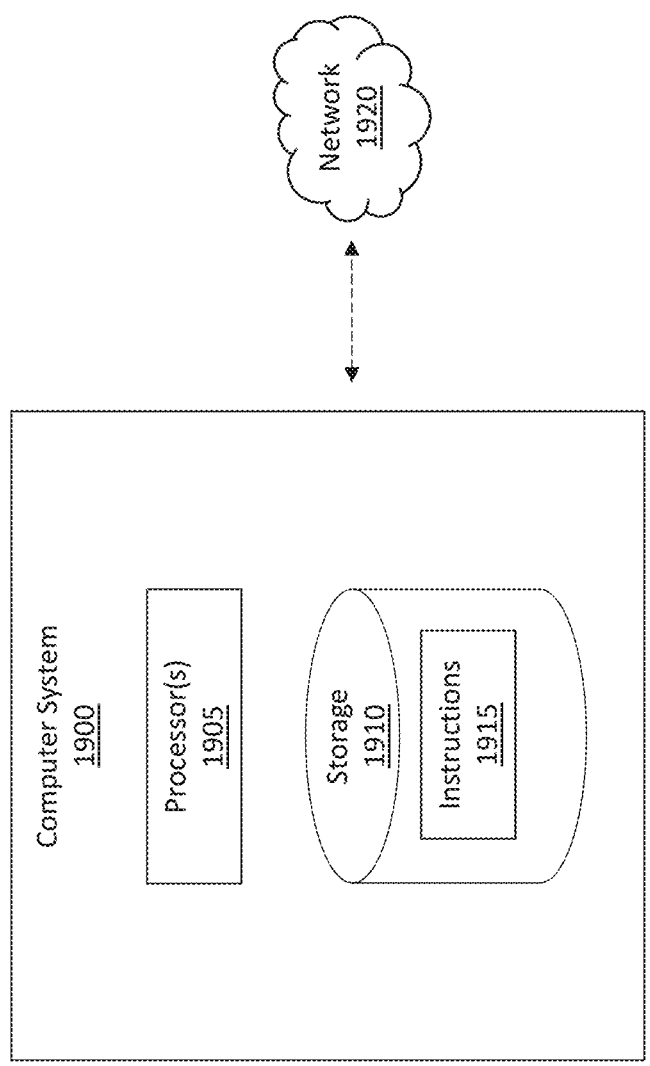
FIG. 19 illustrates an example computer system that can be configured to perform any of the disclosed operations.

Attention will now be directed to FIG. 19 which illustrates an example computer system 1900 that may include and/or be used to perform any of the operations described herein. For instance, computer system 1900 can implement or provision service 105 from FIG. 1.

Computer system 1900 may take various different forms. For example, computer system 1900 may be embodied as a tablet, a desktop, a laptop, a mobile device, or a standalone device, such as those described throughout this disclosure. Computer system 1900 may also be a distributed system that includes one or more connected computing components/devices that are in communication with computer system 1900.

In its most basic configuration, computer system 1900 includes various different components. FIG. 19 shows that computer system 1900 includes one or more processor(s) 1905 (aka a "hardware processing unit") and storage 1910.

Regarding the processor(s) 1905, it will be appreciated that the functionality described herein can be performed, at least in part, by one or more hardware logic components (e.g., the processor(s) 1905). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1900. The different components, modules, engines, and services described herein may be implemented as objects or processors that execute on computer system 1900 (e.g. as separate threads).

Storage 1910 may be physical system memory, which may be volatile, non-volatile, or some combination of the two. The term "memory" may also be used herein to refer to non-volatile mass storage such as physical storage media. If computer system 1900 is distributed, the processing, memory, and/or storage capability may be distributed as well.

Storage 1910 is shown as including executable instructions 1915. The executable instructions 1915 represent instructions that are executable by the processor(s) 1905 of computer system 1900 to perform the disclosed operations, such as those described in the various methods.

The disclosed embodiments may comprise or utilize a special-purpose or general-purpose computer including computer hardware, such as, for example, one or more processors (such as processor(s) 1905) and system memory (such as storage 1910), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1900 may also be connected (via a wired or wireless connection) to external sensors (e.g., one or more remote cameras) or devices via a network 1920. For example, computer system 1900 can communicate with any number devices or cloud services to obtain or process data. In some cases, network 1920 may itself be a cloud network. Furthermore, computer system 1900 may also be connected through one or more wired or wireless networks to remote/ separate computer systems(s) that are configured to perform any of the processing described with regard to computer system 1900.

A "network," like network 1920, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1900 will include one or more communication channels that are used to communicate with the network 1920. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for provisioning a central, cloud-based service (i) that generates customized queries for execution against a plurality of third-party and internal applications to collect certain metric data and (ii) that generates an evaluation score based on the collected metric data, said method comprising:

for each third-party application in a set of third-party applications, causing the service to generate a corresponding query that is executable against said each third-party application, wherein the corresponding query is designed to extract a pre-selected type of metric data from said each third-party application, wherein said generating is performed via use of corresponding application programming interfaces (APIs) that are provided to facilitate metric data extraction from the set of third-party applications, wherein the set of third-party applications includes a combination of two or more of the following: a fleet tracking management application, a digital time keeping application, and a mapping and measurement application, and wherein the preselected type of metric data includes a combination of two or more of the following: location and movement data, clock in/out data, environmental condition data, and image data;

causing the service to transmit, over one or more networks, each respective query to its corresponding third-party application;

causing the service to receive, from each third-party application in the set of third-party applications, a corresponding data structure comprising metric data that was generated based on an execution of a corresponding query, wherein:

a first data structure comprising first metric data is received from a first third-party application, a second data structure comprising second metric data is received from a second third-party application, and the first data structure is different from the second data structure;

causing the service to determine that the first metric data and the second metric data correspond to a same event;

despite the second data structure being different from the first data structure, causing the service to use the first metric data and the second metric data to validate one another with respect to the event;

causing the service to train a machine learning (ML) algorithm to infer events based on collections of different types of metric data that are collected from multiple different sources and that do not specifically identify the events that are to be inferred such that the events are inferable only after the different types of metric data are aggregated and analyzed as a combination;

causing the service to use the trained ML algorithm to infer the event that corresponds with both the first metric data and the second metric data such that an inference for the event is determined by the ML algorithm, wherein the event is inferred by the ML algorithm after the first metric data and the second metric data are aggregated and analyzed together, and wherein the event is inferred despite neither one of the first metric data or the second metric data specifically identifying the event;

causing the service to weight the metric data based on a set of predefined weighting criteria and based on the inference for the event;

causing the service to generate an evaluation score based on the weighted metric data;

causing the service to map the evaluation score to a stimulus factor associated with a user, the stimulus factor being selected to influence a behavior of the user; and causing the service to alert the user regarding the stimulus factor.

2. The method of claim 1, wherein the first third-party application is a global positioning system (GPS) application operating on a mobile device, and wherein the first data structure is generated by the GPS application.

3. The method of claim 2, wherein the second third-party application is the digital time keeping application, and wherein the second data structure is generated by the digital time keeping application.

4. The method of claim 1, wherein transmitting each respective query is performed on a periodic timeframe.

5. The method of claim 1, wherein the evaluation score is increased or reduced based on updated metric data.

6. The method of claim 1, wherein said evaluation score is provided for a group of individual entities.

7. The method of claim 1, wherein the first data structure formats the first metric data in a different manner than how the second data structure formats the second metric data.

8. The method of claim 1, wherein the predefined weighting criteria include a weighting criterion for events classified as being health and safety events.

9. The method of claim 1, wherein the predefined weighting criteria include a weighting criterion for events classified as being administrative events.

10. The method of claim 1, wherein the predefined weighting criteria include a weighting criterion for events classified as being labor or operational events.

11. The method of claim 1, wherein the predefined weighting criteria include a weighting criterion for events classified as being documentation events.

12. A computer system that provisions a central, cloud-based service (i) that generates customized queries for execution against a plurality of third-party applications to collect certain metric data and (ii) that generates an evaluation score based on the collected metric data, said computer system comprising:

at least one processor; and at least one hardware storage device that stores instructions that are executable by the computer system to:

for each third-party application in a set of third-party applications, cause the service to generate a corresponding query that is executable against said each third-party application, wherein the corresponding query is designed to extract metric data from said each third-party application, and wherein said generating is performed via use of corresponding application programming interfaces (APIs) that are provided to facilitate metric data extraction from the set of third-party applications, wherein the set of third-party applications includes a combination of two or more of the following: a fleet tracking management application, a digital time keeping application, and a mapping and measurement application, and wherein the preselected type of metric data includes a combination of two or more of the following: location and movement data, clock in/out data, environmental condition data, and image data;

cause the service to transmit, over one or more networks, each respective query to its corresponding third-party application;

cause the service to receive, from each third-party application in the set of third-party applications, a corresponding data structure comprising metric data that was generated based on an execution of a corresponding query, wherein:

a first data structure comprising first metric data is received from a first third-party application, a second data structure comprising second metric data is received from a second third-party application, and the first data structure is different from the second data structure;

cause the service to determine that the first metric data and the second metric data correspond to a same event;

despite the second data structure being different from the first data structure, cause the service to use the first metric data and the second metric data to validate one another with respect to the event;

cause the service to train a machine learning (ML) algorithm to infer events based on collections of different types of metric data that are collected from multiple different sources and that do not specifically identify the events that are to be inferred such that the events are inferable only after the different types of metric data are aggregated and analyzed as a combination;

cause the service to use the trained ML algorithm to infer the event that corresponds with both the first metric data and the second metric data such that an inference for the event is determined by the ML algorithm, wherein the event is inferred by the ML algorithm after the first metric data and the second metric data are aggregated and analyzed together, and wherein the event is inferred despite neither one of the first metric data or the second metric data specifically identifying the event;

cause the service to weight the metric data based on a set of predefined weighting criteria and based on the inference for the event;

cause the service to generate an evaluation score based on the weighted metric data;

cause the service to map the evaluation score to a stimulus factor associated with a user, the stimulus factor being selected to influence a behavior of the user; and cause the service to alert the user regarding the stimulus factor.

13. The computer system of claim 12, wherein the one or more networks include a telecommunications network and a wide area network, wherein the first data structure is received over the telecommunications network, and wherein the second data structure is received over the wide area network.

14. The computer system of claim 12, wherein an alert is triggered for transmission to the user in response to updated metric data being received.

15. The computer system of claim 12, wherein an alert is transmitted to the user in response to the evaluation score being updated.

16. The computer system of claim 12, wherein the first metric data and the second metric data describe a labor performance of an individual, and wherein the same event corresponds to a labor event performed by the individual.

17. A method for provisioning a central, cloud-based service (i) that generates customized queries for execution against a plurality of third-party applications to collect certain metric data and (ii) that generates an evaluation score based on the collected metric data, said method comprising:
- for each third-party application in a set of third-party applications, causing the service to generate a corresponding query that is executable against said each third-party application, wherein the corresponding query is designed to extract metric data from said each third-party application, and wherein said generating is performed via use of corresponding application programming interfaces (APIs) that are provided to facilitate metric data extraction from the set of third-party applications, wherein the set of third-party applications includes a combination of two or more of the following: a fleet tracking management application, a digital time keeping application, a mapping and measurement application, a warehouse inventory application, a purchasing application, and a project management application, and wherein the preselected type of metric data includes a combination of two or more of the following: location and movement data, clock in/out data, environmental condition data, and image data;
- causing the service to transmit, over one or more networks, each respective query to its corresponding third-party application;
- causing the service to receive, from each third-party application in the set of third-party applications, a corresponding data structure comprising metric data that was generated based on an execution of a corresponding query, wherein:
  - a first data structure comprising first metric data is received from a first third-party application,
  - a second data structure comprising second metric data is received from a second third-party application, and
  - the first data structure is different from the second data structure;
- causing the service to determine that the first metric data and the second metric data correspond to a same event;
- despite the second data structure being different from the first data structure, causing the service to use the first metric data and the second metric data to validate one another with respect to the event;
- causing the service to train a machine learning (ML) algorithm to infer events based on collections of different types of metric data that are collected from multiple different sources and that do not specifically identify the events that are to be inferred such that the events are inferable only after the different types of metric data are aggregated and analyzed as a combination;
- causing the service to use the trained ML algorithm to infer the event that corresponds with both the first metric data and the second metric data such that a classification for the event is determined by the ML algorithm, wherein the event is inferred by the ML algorithm after the first metric data and the second metric data are aggregated and analyzed together, and wherein the event is inferred despite neither one of the first metric data or the second metric data specifically identifying the event;
- causing the service to weight the metric data based on a set of predefined weighting criteria and based on the inference for the event;
- causing the service to generate an evaluation score based on the weighted metric data;
- causing the service to map the evaluation score to a stimulus factor associated with a user, the stimulus factor being selected to influence a behavior of the user;
- causing the service to alert the user regarding the stimulus factor.

* * * * *